(12) United States Patent
Wen et al.

(10) Patent No.: US 12,407,606 B2
(45) Date of Patent: Sep. 2, 2025

(54) PACKET PROCESSING SYSTEM AND METHOD, MACHINE-READABLE STORAGE MEDIUM, AND PROGRAM PRODUCT

(71) Applicant: Huawei Cloud Computing Technologies Co., Ltd., Guizhou (CN)

(72) Inventors: Xuemin Wen, Beijing (CN); Shaofu Zuo, Beijing (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 17/891,334

(22) Filed: Aug. 19, 2022

(65) Prior Publication Data

US 2022/0393974 A1     Dec. 8, 2022

Related U.S. Application Data

(63) Continuation of application No. PCT/CN2020/136455, filed on Dec. 15, 2020.

(30) Foreign Application Priority Data

Feb. 20, 2020 (CN) .......................... 202010104496.2
Jun. 11, 2020 (CN) .......................... 202010526837.5

(51) Int. Cl.
*G06F 15/173* (2006.01)
*H04L 45/00* (2022.01)
(Continued)

(52) U.S. Cl.
CPC ............ *H04L 45/38* (2013.01); *H04L 45/123* (2013.01); *H04L 47/122* (2013.01)

(58) Field of Classification Search
CPC ............................. H04L 45/38; H04L 47/122
See application file for complete search history.

(56) References Cited

U.S. PATENT DOCUMENTS

| 10,171,423 B1 * | 1/2019 | Woodberg ........... H04L 63/1408 |
| 2013/0254766 A1 | 9/2013 | Zuo et al. |

(Continued)

FOREIGN PATENT DOCUMENTS

| CN | 104205080 A | 12/2014 |
| CN | 104702519 A | 6/2015 |

(Continued)

OTHER PUBLICATIONS

Firestone, D., et al, "Azure Accelerated Networking: SmartNICs in the Public Cloud," 15th USENIX Symposium on Networked Systems Design and Implementation (NSDI 18), Apr. 9-11, 2018, 15 pages.

(Continued)

*Primary Examiner* — Padma Mundur
(74) *Attorney, Agent, or Firm* — Conley Rose, P.C.

(57) ABSTRACT

After receiving a packet, a programmable forwarding device determines whether a flow entry matching the packet exists in a local flow table of the programmable forwarding device. If the flow entry does not exist, the programmable forwarding device sends the packet to a computing device. After receiving the packet, a programmable network adapter in the computing device determines whether a flow entry matching the packet exists in a local flow table of the programmable network adapter. If the flow entry does not exist, the programmable network adapter sends the packet to a processor in the computing device, so that a gateway running on the processor processes the packet.

18 Claims, 14 Drawing Sheets

(51) Int. Cl.
*H04L 45/12* (2022.01)
*H04L 47/122* (2022.01)

(56) References Cited

U.S. PATENT DOCUMENTS

| | | |
|---|---|---|
| 2016/0285770 A1 | 9/2016 | Yang |
| 2018/0212869 A1 | 7/2018 | Wu et al. |
| 2019/0012350 A1 | 1/2019 | Sindhu et al. |
| 2019/0081899 A1 | 3/2019 | Mundkur et al. |
| 2019/0289102 A1* | 9/2019 | Goel ................. H04L 45/74591 |
| 2020/0213154 A1* | 7/2020 | Han ................... H04L 45/7453 |
| 2020/0328966 A1 | 10/2020 | Wang et al. |
| 2020/0374231 A1* | 11/2020 | Cai ................... H04L 45/74591 |

FOREIGN PATENT DOCUMENTS

| | | |
|---|---|---|
| CN | 109962832 A | 7/2019 |
| EP | 2808760 B1 | 12/2014 |
| EP | 3068085 B1 | 10/2017 |
| EP | 2828760 B1 | 1/2019 |
| WO | 2018023498 A1 | 2/2018 |

OTHER PUBLICATIONS

Qian, K., et al, "FlexGate: High-performance Heterogeneous Gateway in Data Centers," https://doi.org/10.1145/3343180.3343182, Association for Computing Machinery, Aug. 17-18, 2019, 7 pages.
China Communications Society, "P4 2018 China Summit," Barefoot Networks, https://www.bagevent.com/event/1911282, Nov. 15, 2018, 16 pages. With an English translation.

\* cited by examiner

PACKET PROCESSING SYSTEM AND METHOD, MACHINE-READABLE STORAGE MEDIUM, AND PROGRAM PRODUCT

CROSS-REFERENCE TO RELATED APPLICATIONS

This is a continuation of International Patent Application No. PCT/CN2020/136455 filed on Dec. 15, 2020, which claims priority to Chinese Patent Application No. 202010526837.5 filed on Jun. 11, 2020, and Chinese Patent Application No. 202010104496.2 filed on Feb. 20, 2020. All of the aforementioned patent applications are hereby incorporated by reference in their entireties.

TECHNICAL FIELD

This disclosure generally relates to the field of network technologies, and more specifically, to a packet processing system and method, a machine-readable storage medium, and a program product.

BACKGROUND

A packet is a data packet exchanged or transmitted in a network, and usually includes a header and a data part. A packet flow refers to consecutive packets that pass through a network node within a period of time. For example, each packet may include 5-tuple information, where the 5-tuple includes a source Internet Protocol (IP) address, a destination IP address, a source port, a destination port, and a transport layer protocol. The 5-tuple may be used as an identifier to distinguish between different sessions.

A gateway is a network gateway for communication between networks using different architectures or protocols. The gateway provides network compatibility functions, such as protocol conversion, route selection, and data exchange, to implement communication between different networks. For example, on a cloud computing platform, to provide different cloud network services for tenants, a cloud service provider provides different types of virtual gateway server clusters in a cloud computing infrastructure, to provide different virtual network services, such as a network address translation (NAT) gateway, a stateful firewall, a load balancer, and a manual gateway.

SUMMARY

According to some embodiments of this disclosure, a packet processing system and method, a machine-readable storage medium, and a program product are provided.

According to a first aspect of this disclosure, a packet processing system is provided. The system includes a programmable forwarding device and a computing device. The computing device includes a programmable network adapter, a processor, and a memory. The processor executes instructions in the memory to run a gateway. The programmable forwarding device is configured to: receive a packet, determine whether a flow entry matching the packet exists in a flow table accessible to the programmable forwarding device, and if the flow entry does not exist, send the packet to the programmable network adapter. The programmable network adapter is configured to: receive the packet, determine whether a flow entry matching the packet exists in a flow table accessible to the programmable network adapter, and if the flow entry does not exist, send the packet to the processor. The processor is configured to: run the gateway to receive the packet, and process the packet based on a flow entry in a flow table accessible to the gateway. According to the packet processing system according to the first aspect of this disclosure, at least some packet flows at the gateway running on the processor can be offloaded to the programmable forwarding device and the programmable network adapter for processing, to improve packet flow processing efficiency.

In some embodiments, the flow table accessible to the programmable network adapter includes a flow entry offloaded from the flow table accessible to the gateway, and the flow table accessible to the programmable forwarding device includes a flow entry offloaded from the flow table accessible to the programmable network adapter. In this manner, the programmable forwarding device and the programmable network adapter can directly process a packet by using the offloaded flow entry, to improve packet processing efficiency.

In some embodiments, the processor is configured to: collect statistics about a packet flow processed by the gateway in a unit time period; and determine a traffic ranking of a session in the packet flow through the statistics collection. Statistics about traffic rankings of all sessions are collected, so that most suitable traffic can be selected and offloaded to the programmable forwarding device and the programmable network adapter.

In some embodiments, the packet processing system further includes a controller. The processor is further configured to send first session information of a first quantity of sessions in the traffic ranking to the controller. The controller is configured to: receive the first session information, and send a first group of flow tables related to the first session information to the programmable network adapter. The programmable network adapter is further configured to: collect statistics about a second packet flow processed by the programmable network adapter in the unit time period; determine a second traffic ranking of a session in the second packet flow through the statistics collection; and send second session information of a second quantity of sessions in the second traffic ranking to the controller. The controller is further configured to: receive the second session information, and send a second group of flow entries related to the second session information to the programmable forwarding device. In this phased offloading manner, heavy traffic can be offloaded to the programmable forwarding device with best traffic processing performance for processing, and medium traffic can be offloaded to the programmable network adapter with good traffic processing performance for processing, to further improve packet flow processing efficiency. In addition, the controller is deployed, so that centralized control of flow table offloading can be implemented.

In some embodiments, the packet processing system further includes a controller, and the controller is configured to: receive session information related to a plurality of sessions in the traffic ranking from the processor; determine a first group of sessions and a second group of sessions based on the session information, where traffic of a session in the first group of sessions is heavier than traffic of a session in the second group of sessions; send a flow entry related to the first group of sessions to the programmable forwarding device; and send a flow entry related to the second group of sessions to the programmable network adapter. In this joint offloading manner, heavy traffic can be offloaded to the programmable forwarding device and the programmable network adapter that have better traffic processing performance for processing, to further improve packet flow processing efficiency.

In some embodiments, the processor is configured to: send a flow entry related to a plurality of sessions in the traffic ranking to the programmable network adapter; or send a flow entry related to a first group of sessions in the plurality of sessions to the programmable switch, and send a flow entry related to a second group of sessions in the plurality of sessions to the programmable network adapter, where traffic of a session in the first group of sessions is heavier than traffic of a session in the second group of sessions. In this manner, heavy traffic can be offloaded to the programmable forwarding device and the programmable network adapter that have better traffic processing performance for processing, to further improve packet flow processing efficiency.

In some embodiments, the packet processing system further includes a controller. The programmable forwarding device or the programmable network adapter is further configured to: identify a session interrupt packet including an interrupt flag, and send the session interrupt packet to the controller or the processor; and the controller or the processor is configured to: when determining, based on the session interrupt packet, that a session ends, send, to the programmable forwarding device or the programmable network adapter, an instruction used to delete a flow entry. Clearing a gateway flow entry related to the ended session can release storage space of the programmable forwarding device and/or the intelligent network interface card. This helps add a new gateway flow entry, to improve packet flow processing efficiency.

In some embodiments, the packet processing system further includes a controller, and the controller or the processor is configured to perform at least one of the following: if no session heartbeat packet from the programmable forwarding device is received within a threshold time period, sending, to the programmable forwarding device, an instruction used to delete a flow entry; and if no session heartbeat packet from the programmable network adapter is received within the threshold time period, sending, to the programmable network adapter, an instruction used to delete a flow entry. A gateway flow entry related to a session that may have ended is cleared, so that storage space of the programmable forwarding device and/or the intelligent network interface card can be released. This helps add a new gateway flow entry, to improve packet flow processing efficiency.

In some embodiments, the packet processing system further includes a controller. The programmable forwarding device is further configured to: when the flow entry matching the packet does not exist in the flow table accessible to the programmable forwarding device, send the packet to the controller, and determine, based on a forwarding entry received from the controller, that the packet is to be forwarded to the computing device. The controller is further configured to send the forwarding entry to the programmable forwarding device. Because the controller has a stronger traffic scheduling capability, the controller can forward the packet to a most suitable computing device.

In some embodiments, the programmable forwarding device is disposed in a cabinet and is connected to a plurality of computing devices in the cabinet, and the controller is deployed on one of a plurality of computing devices. The controller is deployed in the computing device, so that a scheduling capability of the controller can be ensured, to facilitate traffic scheduling in the system.

In some embodiments, the controller is deployed in an operating system of the programmable forwarding device, and controls a programmable switching chip in the programmable forwarding device through an interface. In this manner, a processor of the programmable forwarding device can be used to implement functions of the controller, to improve deployment flexibility of the controller and simplify a network architecture.

In some embodiments, the controller generates a consistent hashing flow table used for consistent hashing scheduling, and the controller sends the consistent hashing flow table to the programmable forwarding device. In this manner, the programmable forwarding device can implement a complex scheduling function.

In some embodiments, the programmable forwarding device is a programmable switch having a programmable parser, a programmable match-action table, and a programmable deparser, the computing device is a server, and the programmable network adapter is an intelligent network interface card having a communication protocol processing capability. Therefore, according to the gateway flow entry offloading solution in this embodiment of this disclosure, some packet flows at the gateway running on the processor can be offloaded to the programmable switch and the intelligent network interface card for processing, to improve packet flow processing efficiency.

According to a second aspect of this disclosure, a packet processing system is provided. The system includes a programmable forwarding device and a computing device. The computing device includes a programmable network adapter, a processor, and a memory. The processor executes instructions in the memory to run a gateway. The programmable forwarding device is configured to: receive a first packet, and process the first packet based on a flow entry that is in a flow table accessible to the programmable forwarding device and that matches the first packet. The programmable network adapter is configured to: receive a second packet, and process the second packet based on a flow entry that is in a flow table accessible to the programmable network adapter and that matches the second packet. The processor is configured to: run the gateway to receive a third packet, and process the third packet based on a flow entry that is in a flow table accessible to the gateway and that matches the third packet. The flow table accessible to the programmable network adapter includes a flow entry offloaded from the flow table accessible to the gateway, and the flow table accessible to the programmable forwarding device includes a flow entry offloaded from the flow table accessible to the gateway. The flow table accessible to the programmable forwarding device may include a flow entry directly offloaded from the flow table accessible to the gateway, or may include a flow entry indirectly offloaded from the flow table accessible to the gateway. For example, the programmable network adapter may first offload the flow entry from the gateway, and then the programmable forwarding device offloads the flow entry from the programmable network adapter. According to the packet processing system according to the second aspect of this disclosure, at least some packet flows at the gateway running on the processor can be offloaded to the programmable forwarding device and the programmable network adapter for processing, to improve packet flow processing efficiency.

In some embodiments, the processor is configured to: collect statistics about a packet flow processed by the gateway in a unit time period; and determine a traffic ranking of a session in the packet flow through the statistics collection. Statistics about traffic rankings of all sessions are collected, so that most suitable traffic can be selected and offloaded to the programmable forwarding device and the programmable network adapter.

In some embodiments, the packet processing system further includes a controller. The processor is further configured to send first session information of a first quantity of sessions in the traffic ranking to the controller. The controller is configured to: receive the first session information, and send a first group of flow entries related to the first session information to the programmable network adapter. The programmable network adapter is further configured to: collect statistics about a second packet flow processed by the programmable network adapter in the unit time period; determine a second traffic ranking of a session in the second packet flow through the statistics collection; and send second session information of a second quantity of sessions in the second traffic ranking to the controller. The controller is further configured to: receive the second session information, and send a second group of flow entries related to the second session information to the programmable forwarding device. In this phased offloading manner, heavy traffic can be offloaded to the programmable forwarding device with best traffic processing performance for processing, and medium traffic can be offloaded to the programmable network adapter with good traffic processing performance for processing, to further improve packet flow processing efficiency. In addition, the controller is deployed, so that centralized control of flow table offloading can be implemented.

In some embodiments, the packet processing system further includes a controller, and the controller is configured to: receive session information related to a plurality of sessions in the traffic ranking from the processor; determine a first group of sessions and a second group of sessions based on the session information, where traffic of a session in the first group of sessions is heavier than traffic of a session in the second group of sessions; send a flow entry related to the first group of sessions to the programmable forwarding device; and send a flow entry related to the second group of sessions to the programmable network adapter. In this joint offloading manner, heavy traffic can be offloaded to the programmable forwarding device and the programmable network adapter that have better traffic processing performance for processing, to further improve packet flow processing efficiency.

In some embodiments, the processor is further configured to: send a flow entry related to a plurality of sessions in the traffic ranking to the programmable network adapter; or send a flow entry related to a first group of sessions in the plurality of sessions to the programmable switch, and send a flow entry related to a second group of sessions in the plurality of sessions to the programmable network adapter, where traffic of a session in the first group of sessions is heavier than traffic of a session in the second group of sessions. In this manner, heavy traffic can be offloaded to the programmable forwarding device and the programmable network adapter that have better traffic processing performance for processing, to further improve packet flow processing efficiency.

According to a fourth aspect of this disclosure, a packet processing method is provided. The method includes: A programmable forwarding device receives a packet, determines whether a flow entry matching the packet exists in a flow table accessible to the programmable forwarding device, and if the flow entry does not exist, sends the packet to a programmable network adapter in a computing device. The programmable network adapter receives the packet, determines whether a flow entry matching the packet exists in a flow table accessible to the programmable network adapter, and if the flow entry does not exist, sends the packet to a processor in the computing device. A gateway running on the processor receives the packet, and processes the packet based on a flow entry in a flow table accessible to the gateway. According to the packet processing method according to the third aspect of this disclosure, at least some packet flows at the gateway running on the processor can be offloaded to the programmable forwarding device and the programmable network adapter for processing, to improve packet flow processing efficiency.

According to a fourth aspect of this disclosure, one or more machine-readable storage media are provided. The machine-readable storage medium stores a first instruction set executed by a programmable forwarding device, a second instruction set executed by a programmable network adapter, and a third instruction set executed by a processor. When the first instruction set, the second instruction set, and the third instruction set are executed, a system including the programmable forwarding device, the programmable network adapter, and the processor is enabled to perform the method according to the third aspect or possible variations of the third aspect. In some embodiments, the machine-readable storage medium may be non-transient. The machine-readable storage medium includes but is not limited to a volatile memory (for example, a random-access memory (RAM)) and a nonvolatile memory (for example, a flash memory, a hard disk drive (HDD), or a solid-state drive (SSD)).

According to a fifth aspect of this disclosure, a program product is provided. The program product includes a first instruction set executed by a programmable forwarding device, a second instruction set executed by a programmable network adapter, and a third instruction set executed by a processor. When the first instruction set, the second instruction set, and the third instruction set are executed, a system including the programmable forwarding device, the programmable network adapter, and the processor is enabled to perform the method according to the third aspect or possible variations of the third aspect. In some embodiments, the program product may include a plurality of software installation packages. When the method according to the third aspect or possible variations of the third aspect needs to be used, the software installation packages may be downloaded and executed on the programmable forwarding device, the programmable network adapter, and the processor.

BRIEF DESCRIPTION OF DRAWINGS

With reference to the accompanying drawings and the following detailed descriptions, features, advantages, and other aspects of the implementations of this disclosure become more apparent. Several implementations of this disclosure are shown herein by way of example but not limitation. In the accompanying drawings, details are as follows.

DESCRIPTION OF EMBODIMENTS

Figure 1:
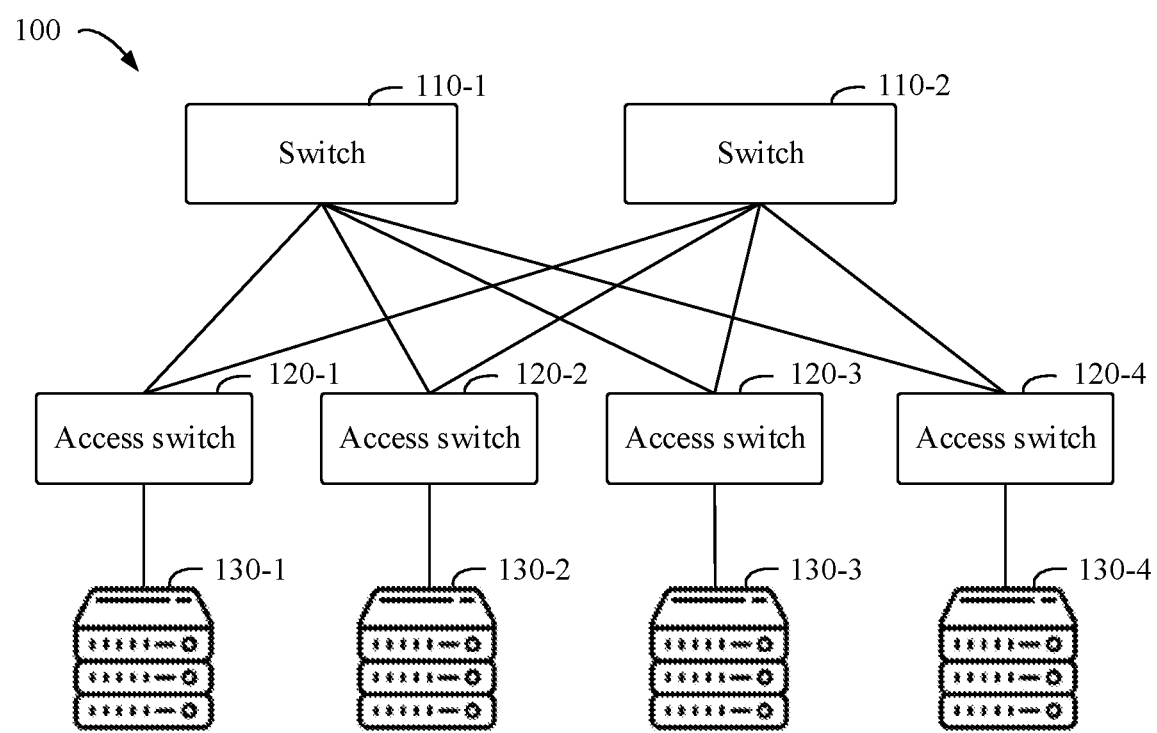
FIG. 1 shows an example network architecture of a data center according to an embodiment of this disclosure.

The following describes implementations of this disclosure in more detail with reference to the accompanying drawings. Although example embodiments of this disclosure are shown in the accompanying drawings, it should be understood that this disclosure may be implemented in various forms and should not be limited to embodiments described herein. Rather, these embodiments are provided to make this disclosure more thorough and complete and to fully convey the scope of this disclosure to a person skilled in the art.

The term "include" and variants thereof used in this specification indicate open inclusion, that is, "include but is not limited to". Unless otherwise stated, the term "or" means "and/or". The term "based on" means "at least partially based on". The terms "embodiments" and "some embodiments" both represent "at least some embodiments". Other explicit and implicit definitions may also be included below.

Usually, a gateway running on a processor in a computing device (for example, a server) may be used for packet processing. The processor has flexible programmability and a large quantity of storage resources. However, the processor is weak in traffic processing performance, for example, a throughput is low and a processing delay is long, which affects performance of the gateway and becomes a bottleneck of performance of a gateway cluster. Although appearance of some tools (for example, a Data Plane Development Kit (DPDK)) improves traffic processing performance (for example, a throughput) of the processor to some extent, compared with a dedicated forwarding device (for example, a switch), the processor still lags far behind in terms of traffic processing performance.

To improve traffic processing performance of the gateway, a possible improvement manner is to offload some functions of the gateway to a programmable network adapter (for example, an intelligent network interface card). Because the intelligent network interface card is a dedicated traffic processing hardware device, compared with the gateway implemented by the processor by using software, the intelligent network interface card has higher traffic processing performance. However, traffic processing performance of the intelligent network interface card is not high enough to adapt to development of network bandwidth. Therefore, embodiments of this disclosure provide a solution for offloading three layers of gateway flow entries of a programmable forwarding device, a programmable network adapter, and a processor, so that at least some packet flows at a gateway running on the processor can be offloaded to the programmable forwarding device and the programmable network adapter for processing, to improve packet flow processing efficiency and improve performance of a gateway cluster.

A dedicated forwarding device (for example, a switch) is featured in a high throughput and a low delay, and has a multi-point collaboration capability, but has a small quantity of storage resources. The programmable network adapter has specific communication protocol processing performance, flexible programmability, and a large quantity of storage resources, but can only perform single-point offloading and therefore lacks a multi-point collaboration capability. Although the processor has poor traffic processing performance, the processor has flexible programmability and a large quantity of storage resources. Therefore, embodiments of this disclosure provide a packet processing architecture in which features and advantages of different devices are properly used, so that layered offloading and processing on a packet flow can be implemented, to implement a gateway function more efficiently. Some example embodiments of this disclosure are described below with reference to FIG. 1 to FIG. 10.

FIG. 1 shows an example network architecture of a data center 100 according to an embodiment of this disclosure. As shown in FIG. 1, the data center 100 may use a two-layer flattened network architecture (for example, a Spine-Leaf network architecture), including switches 110-1 and 110-2 (separately or collectively referred to as switches 110) used as Spine switches, and access switches 120-1, 120-2, 120-3, and 120-4 (separately or collectively referred to as access switches 120) used as Leaf switches. In the network architecture in FIG. 1, a three-layer network is above the Leaf switch, and an independent two-layer broadcast domain is below the Leaf switch. A quantity of Leaf switches may be determined based on a quantity of downlink ports of the Spine switch, and a quantity of Spine switches may be determined based on a quantity of uplink ports of the Leaf switch. The Spine-Leaf network has advantages such as high reliability, high performance, and scalability. Each access switch 120 may be configured to connect to one or more computing devices (such as servers). As shown in FIG. 1, the access switch 120-1 accesses a server cluster 130-1, the access switch 120-2 accesses a server cluster 130-2, the access switch 120-3 accesses a server cluster 130-3, and the access switch 120-4 accesses a server cluster 130-4.

In some embodiments, the server cluster 130-1 may be a server cabinet, and one or more access switches 120 may be deployed in one server cabinet. Each server in the server cabinet may be directly connected to an access switch in the cabinet, to implement interconnection between the server and the access switch in the cabinet. Optionally, the access switch 120 may be located at the top of the server cabinet, and therefore may also be referred to as a top of rack (ToR) switch. Alternatively, the access switch 120 may be located in the middle or at the bottom of the server cabinet. An architecture of the ToR switch simplifies a connection between the server in the server cabinet and the access switch, reducing complexity of the network architecture. It should be understood that, although the server cabinet is used as an example of the server cluster 130-1, the server cluster 130-1 may also be provided in another form. In addition, the access switch may also be a switch other than the ToR switch.

In the example network architecture in FIG. 1, communication between any two access switches 120 may be implemented by using one Spine switch 110. Therefore, a network delay between the access switches 120 can be controlled. In addition, the access switches 120 and the switches 110 are fully cross-connected. Therefore, a fault of a single switch at any layer does not affect the entire network architecture, and therefore this network architecture has high reliability. It should be understood that, although FIG. 1 shows the two-layer network architecture of the Spine-Leaf network structure, embodiments of this disclosure may also be applied to a three-layer network architecture or another tree network architecture. For example, in the three-layer network architecture, the access switch 120 is located at an access stratum, the switch 110 is located at an aggregation layer and is used as an aggregation switch, and the switch 110 is further connected to a core switch (not shown) at a core layer. In the three-layer network architecture, a path through which communication between two access switches 120 needs to be performed is: the access switch→the aggregation switch→the core switch→the aggregation switch-→the access switch. A long path may cause a long delay. In some embodiments, the data center 100 may be constructed in a form of a point of delivery (POD), and includes a network server POD carrying a gateway function and a data server POD. As a scale increases, a corresponding POD may be added. For example, an architectural form of a core layer and a plurality of PODs may be used, and each POD may include one or more top of rack switches.

Figure 2A:
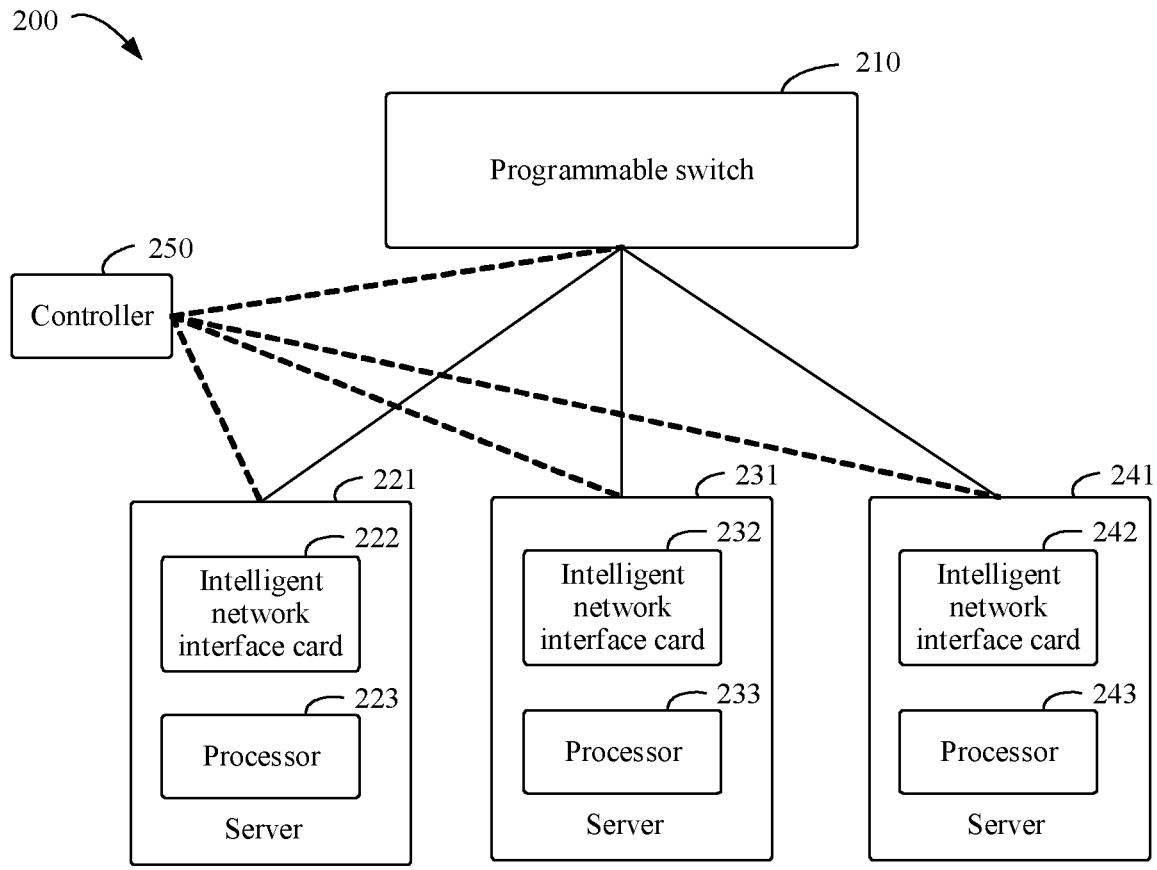
FIG. 2A is a diagram of an example architecture of a packet processing system according to an embodiment of this disclosure.

FIG. 2A is a diagram of an example architecture of a packet processing system 200 according to an embodiment of this disclosure. Although the packet processing system 200 in the example of FIG. 2A includes three servers, the packet processing system in this embodiment of this disclosure may include more or fewer servers. As shown in FIG. 2A, the packet processing system 200 includes a programmable switch 210, servers 221, 231, and 241, and a controller 250. The servers 221, 231, and 241 may be physically connected to the switch 210 through network cables. Optionally, the servers 221, 231, and 241 and the switch 210 may be located in a same server cabinet, and may be directly connected through network cables. Alternatively, the servers 221, 231, and 241 and the switch 210 may be located in different server cabinets or located at different locations, and may be indirectly connected through one or more other network devices (for example, switches). The programmable switch 210 may be the access switch 120 shown in FIG. 1. Alternatively, the programmable switch 210 may be a switch at a higher layer, for example, the switch 110 shown in FIG. 1. In this case, the programmable switch 210 may be connected to each server through one or more network components (for example, switches). Different from a function of a common switch, a function of the programmable switch 210 may be customized by a user by using a programming language. The following describes schematic diagrams of example structures of the programmable switch 210 with reference to FIG. 5A and FIG. 5B. An operating system of the switch runs on the programmable switch 210. However, a difference from an operating system of a computer lies in that the operating system of the programmable switch is specially designed and developed for packet processing. For example, a special network application runs on the programmable switch 210 to serve a network function, for example, a network routing protocol such as Open Shortest Path First (OSPF) or a Border Gateway Protocol (BGP). The special network application may be used to implement functions such as network routing, monitoring, and security. The programmable switch 210 includes a programmable switching chip. The programmable switching chip is specially optimized and customized for processing various high-rate and low-delay network data packets in a network. Therefore, a packet processing capability of the programmable switch is higher than a packet processing capability of a processor. In some embodiments, the programmable switch 210 and the servers 221, 231, and 241 may be located in a same server cabinet, and the controller 250 may be a software module implemented on a device in the server cabinet, and is configured to manage traffic scheduling in the packet processing system 200. In some embodiments, the packet processing system 200 may be implemented as a part of a cloud data center, to provide different network services for tenants, and a corresponding gateway may be deployed.

Refer to FIG. 2A. Each server includes an intelligent network interface card and a processor (for example, a central processing unit (CPU)). The processor may run a gateway, for example, implement a gateway function by using an X86 architecture and a DPDK technology. A DPDK is a data plane development kit, and can provide library function and driver support for packet processing in a processor architecture. Different from an operating system that aims at universal design, the DPDK focuses on high-performance packet processing in a network application. For example, the server 221 includes an intelligent network interface card 222 and a processor 223, the server 231 includes an intelligent network interface card 232 and a processor 233, and the server 241 includes an intelligent network interface card 242 and a processor 243. In this embodiment of this disclosure, the processors 223, 233, and 243 respectively in the servers 221, 231, and 241 are programmed to implement a gateway function by using software, such as a NAT gateway, an internet gateway (IGW), an external network gateway (EGW), and a manual gateway. To improve stability of the gateway, gateway backup can be provided to form a master/slave pair of the gateway. Alternatively, the servers 221, 231, and 241 in the packet processing system 200 may be computing devices other than the servers, for example, computers. In this embodiment of this disclosure, a network adapter in the server is a programmable intelligent network interface card. In addition to helping the server receive and send a packet, the intelligent network interface card may further offload traffic processing work from a processor in the server, to improve resource utilization of the server. The following describes a schematic diagram of an example structure of an intelligent network interface card 232 with reference to FIG. 4.

In some embodiments, to improve utilization of computing and storage resources in the server, the data center may start to use a virtualization technology. Therefore, a large quantity of virtual machines appears in a network. For example, a plurality of virtual machines (VMs) may be obtained through virtualization on one physical server by using the virtualization technology. In addition, the server cluster may further provide cloud services. A user can apply for an isolated and private virtual network environment in a cloud environment, and can freely configure sub services such as an IP address segment, a subnet, and a security group in a virtual private cloud.

The packet processing system 200 may be presented to the outside as a whole, and provides a virtual IP (VIP) address to the outside. An internal structure of the packet processing system 200 may not be transparent to the outside, and the packet processing system 200 may adapt to various gateways or virtual gateways in the cloud environment. An external device may access the packet processing system 200 by using the VIP address. After a packet enters the packet processing system 200, the packet is first received by the programmable switch 210. Distribution of the packet in the packet processing system 200 is determined by the programmable switch 210 and the controller 250. The controller 250 may be implemented by using a processor in the server, to implement traffic scheduling. For example, the controller 250 may determine, according to an internal scheduling algorithm, a server to which the packet received by the packet processing system 200 needs to be sent. In some embodiments, the controller 250 may provide an application programming interface (API) to the outside, so that an administrator can conveniently select a proper scheduling algorithm and algorithm parameter. The administrator may implement, through the API, traffic scheduling based on a user-defined weight, a diversion policy based on a virtual network interface or a virtual machine, a diversion policy used when a node goes online or offline, and the like. In addition, the controller 250 may further send a flow entry of a gateway running on the processor to the programmable switch and/or the intelligent network interface card, so that the programmable switch or the intelligent network interface card can directly process a packet based on the gateway flow entry without forwarding the packet to the processor for processing. For example, an example of the flow entry may include a match field (used to identify a packet corresponding to the flow entry), a priority (which defines a priority of the flow entry), a timer (which stores related statistical information), and a processing instruction (an action that needs to be performed after the flow entry is matched). Further, although FIG. 2A shows only a single programmable switch 210, the programmable switch 210 may be a logical switch that actually includes one or more physical switches. Similarly, the intelligent network interface cards 222, 232, and 242 shown in FIG. 2A may also separately include one or more physical intelligent network interface cards.

Figure 2B:
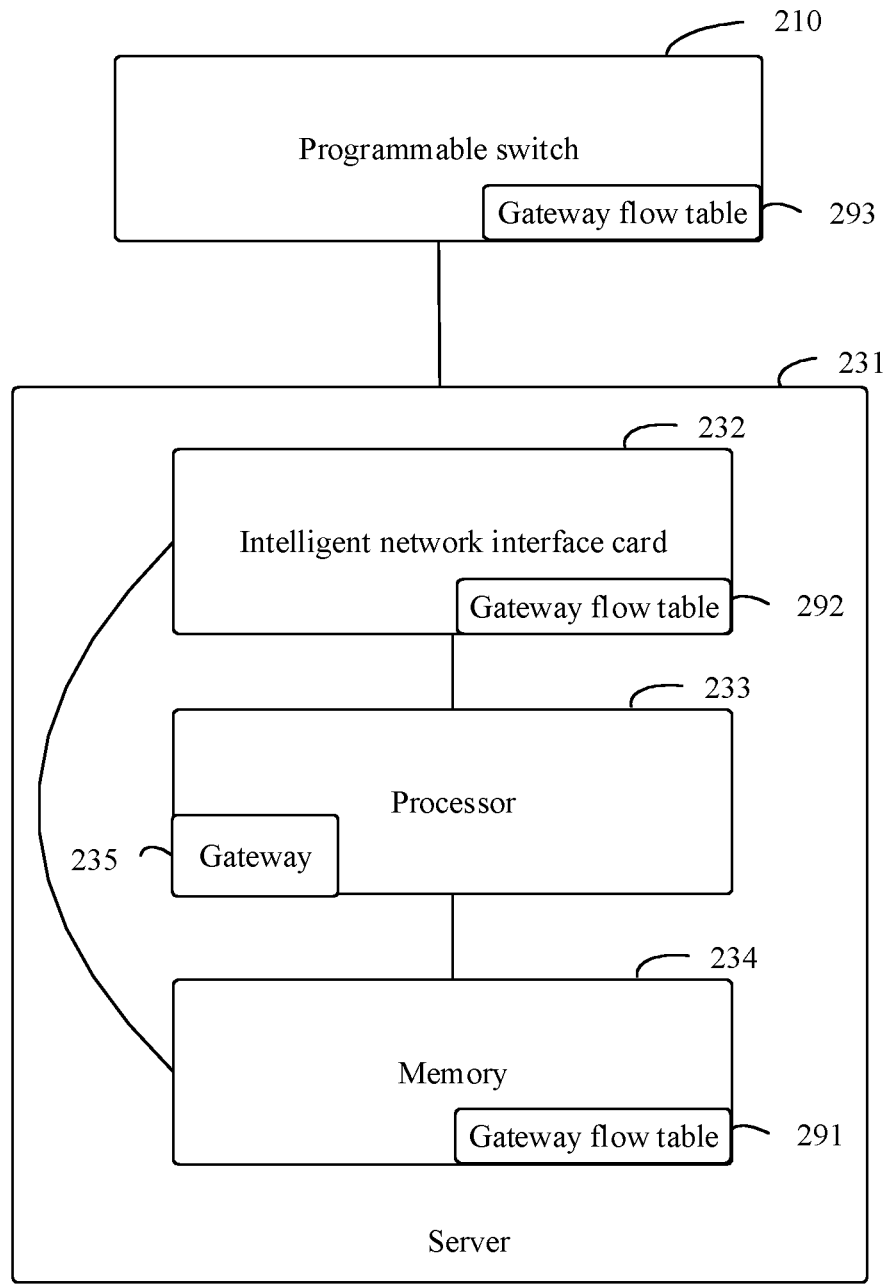
FIG. 2B is a schematic diagram of deployment of a gateway flow table according to an embodiment of this disclosure.

FIG. 2B is a schematic diagram of deployment of a gateway flow table according to an embodiment of this disclosure. As shown in FIG. 2B, a memory 234 in the server 231 stores a gateway flow table 291, where the gateway flow table 291 includes gateway flow entries generated according to various algorithms or policies. The processor 233 executes instructions in the memory 234 to run a gateway 235. The gateway 235 may process (for example, modify, pack, or discard) a received packet based on the gateway flow entry in the gateway flow table 291, to implement a gateway function. In this embodiment of this disclosure, because the programmable switch 210 and the intelligent network interface card 232 have a programmable packet processing capability, the programmable switch 210 and the intelligent network interface card 232 can assist the gateway 235 in implementing some network functions. A memory in the programmable switch 210 may store a gateway flow table 293, and a memory in the intelligent network interface card 232 may store a gateway flow table 292. The gateway flow tables 293 and 292 may be initially empty, and gateway flow entries may be dynamically added and/or deleted. For example, some gateway flow entries in the gateway flow table 291 may be offloaded to the gateway flow table 293 in the programmable switch 210, and the other gateway flow entries in the gateway flow table 291 may be offloaded to the gateway flow table 292 in the intelligent network interface card 232. The flow table in this disclosure includes at least one flow entry.

As shown in FIG. 2B, the gateway 235 running on the processor 233 may process the received packet based on a corresponding gateway flow entry in the gateway flow table 291 in the memory 234. In addition to accessing the gateway flow table 292 in the memory in the intelligent network interface card 232, the intelligent network interface card 232 may further access a gateway flow table (not shown) in the memory 234 through a direct memory access (DMA) channel. Therefore, in this embodiment of this disclosure, a local gateway flow table of the programmable switch 210 is the gateway flow table 293 stored in the memory in the programmable switch 210, and a local gateway flow table of the processor 233 is the gateway flow table 291 stored in the memory 234 in the server 231. A local gateway flow table of the intelligent network interface card 232 may be the gateway flow table 292 stored in the memory in the intelligent network interface card 232, or may be the gateway flow table that is in the memory 234 and that can be accessed through the DMA channel.

Figure 3:
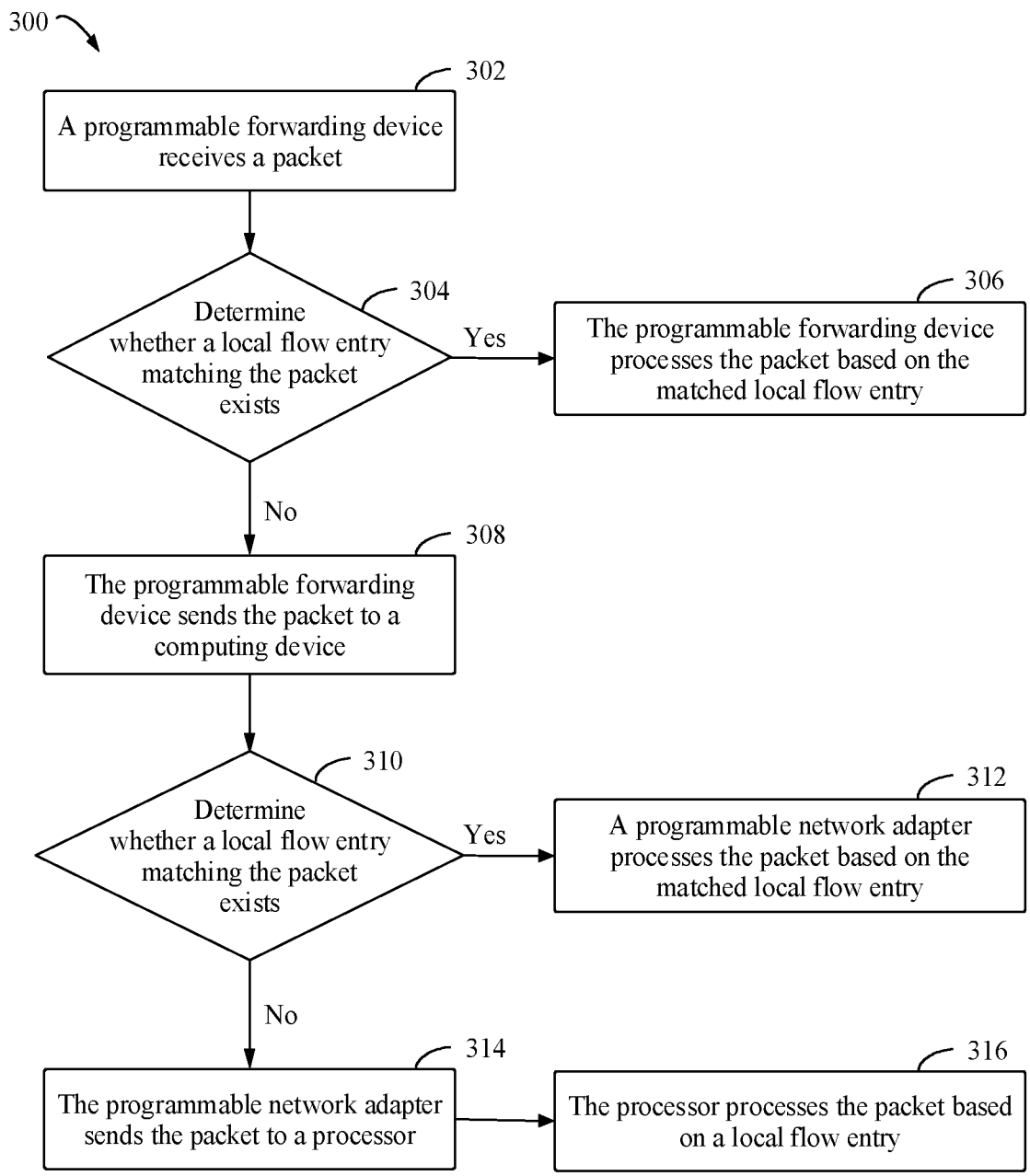
FIG. 3 is a flowchart of a packet processing method according to an embodiment of this disclosure.

FIG. 3 is a flowchart of a packet processing method 300 according to an embodiment of this disclosure. The method 300 is described herein with reference to the packet processing system 200 described in FIG. 2A and FIG. 2B. However, the packet processing method 300 is not limited to being performed by the packet processing system 200 described in FIG. 2A and FIG. 2B. In block 302, a programmable forwarding device receives a packet, for example, receives a packet outside or inside a data center, where the programmable forwarding device is, for example, a programmable switch or a programmable router. For example, after entering the packet processing system 200 described in FIG. 2A, the packet is first received by the programmable switch 210.

In block 304, the programmable forwarding device determines whether a local flow entry matching the packet exists in a local flow table of the programmable forwarding device. For example, the programmable switch 210 determines, by determining whether the local gateway flow table 293 includes a gateway flow entry that matches the packet and that is offloaded from the gateway, whether to directly process the packet or send the packet to a computing device (for example, the server 231). The gateway is run by a processor in each computing device. According to this embodiment of this disclosure, a gateway flow entry of the gateway 235 may be offloaded to the programmable switch 210 by using the controller 250 or the processor 233. If the programmable forwarding device determines, in block 304, that the local flow entry matching the packet exists in the local flow table of the programmable forwarding device, the programmable forwarding device directly processes the packet based on the local gateway flow entry in block 306. For example, if the programmable switch 210 includes a local gateway flow entry matching the packet, the programmable switch 210 may directly process (for example, match, modify, or discard) the packet without forwarding the packet to a server for packet processing. If the programmable forwarding device determines, in block 304, that the local flow entry matching the packet does not exist in the local flow table of the programmable forwarding device, the programmable forwarding device sends the packet to a computing device in block 308. The computing device is, for example, a server or a computer. For example, when the programmable switch 210 does not include a matched local gateway flow entry, the programmable switch 210 forwards the packet to a server for processing. In some embodiments, the programmable switch 210 may forward, according to a preset scheduling algorithm (for example, equal-cost multi-path routing (ECMP)), the packet to a gateway running on a processor in the server for processing. Alternatively, the programmable switch 210 may send the packet to the controller 250, and the controller 250 determines, according to an internal scheduling algorithm, a server gateway to which the packet is to be sent, and sends a related forwarding entry to the programmable switch 210. After receiving the forwarding entry from the controller 250, the programmable switch 210 forwards the packet to a corresponding server (for example, the server 231).

In block 310, a programmable network adapter (for example, an intelligent network interface card) in the computing device determines whether a local flow entry matching the packet exists in a local flow table of the programmable network adapter. For example, after the server 231 receives the packet from the programmable switch 210, the intelligent network interface card 232 in the server 231 first receives the packet and determines whether the local gateway flow table 292 of the intelligent network interface card 232 or the gateway flow table in the memory 234 includes a matched gateway flow entry, to determine whether to directly process the packet or send the packet to the processor 233 in the server 231. If the programmable network adapter determines, in block 310, that the local flow entry matching the packet exists in the local flow table of the programmable network adapter, the programmable network adapter processes the packet based on the local gateway flow entry in block 312. For example, if the intelligent network interface card 232 includes a gateway flow entry matching the packet, the intelligent network interface card 232 may directly process (for example, match, modify, or discard) the packet without forwarding the packet to the processor 233 for packet processing. If the programmable network adapter determines, in block 310, that the local flow entry matching the packet does not exist in the local flow table of the programmable network adapter, the programmable network adapter sends the packet to a processor in the computing device in block 314. For example, the intelligent network interface card 232 sends the packet to the processor 233. In block 316, the gateway 235 running on the processor 233 processes the packet based on a related gateway flow entry in the gateway flow table 291.

Therefore, according to the packet processing method 300 in this embodiment of this disclosure, after the packet processing system 200 receives the packet, if the gateway flow entry matching the packet has been sent to the programmable switch 210, the programmable switch 210 directly processes the packet without forwarding the packet to the server for packet processing. Because the programmable switch 210 has very good traffic processing performance, packet processing efficiency can be significantly improved. However, if the gateway flow entry matching the packet has not been sent to the programmable switch 210 but has been sent to the intelligent network interface card (for example, the intelligent network interface card 232), the intelligent network interface card 232 directly processes the packet without forwarding the packet to the corresponding processor 233 for processing. Because the intelligent network interface card has good traffic processing performance, packet processing efficiency can also be improved. In addition, the programmable switch 210 usually includes a plurality of interfaces, and may access a plurality of distributed nodes. Multi-point collaboration can be implemented by considering traffic characteristics of different nodes. Therefore, according to the packet processing method 300 in this embodiment of this disclosure, at least some packet flows at the gateway running on the processor can be offloaded to the programmable forwarding device layer and the programmable network adapter for processing, to improve packet flow processing efficiency.

Figure 4:
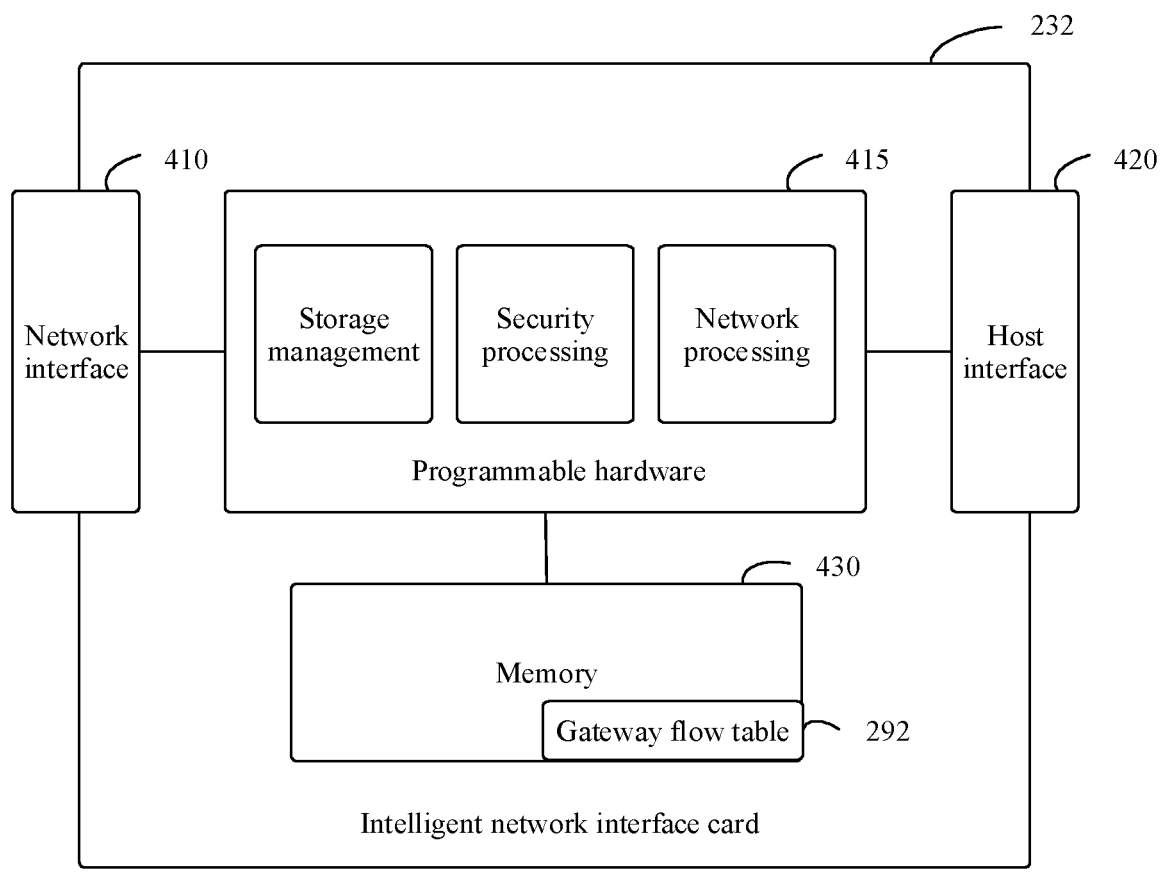
FIG. 4 is a schematic diagram of an example structure of an intelligent network interface card according to an embodiment of this disclosure.

FIG. 4 is a schematic diagram of an example structure of an intelligent network interface card 232 according to an embodiment of this disclosure. As shown in FIG. 4, the intelligent network interface card 232 may include a network interface 410 (an Ethernet interface, for example, an RJ-45 interface) connected to a network side, programmable hardware 415, a host interface 420 (for example, a Peripheral Component Interconnect Express (PCIe) interface) that is of a processor and that is connected to a host side, and a memory 430. The intelligent network interface card 232 may be connected to the programmable switch 210 through the network interface 410, to receive and send traffic. A gateway flow table 292 stored in the memory 430 may include one or more gateway flow entries offloaded from a gateway running on the processor. After receiving an external packet, a common network adapter only determines whether the packet is sent to a device of the common network adapter or another device. If the packet is sent to the device of the common network adapter, the common network adapter indicates the processor to process the packet. If the packet is not sent to the device of the common network adapter, the common network adapter forwards or discards the packet. In addition, after receiving a packet sent by the processor, the common network adapter also directly forwards the packet. Because the intelligent network interface card 232 includes the programmable hardware 415, in addition to receiving and sending a packet, the intelligent network interface card 232 may further offload some packet processing work and tasks, for example, packet modification, from the gateway 235 running on the processor 233. For example, the intelligent network interface card 232 may help, through programming, the processor implement some work such as storage management, security processing, and network processing. This not only improves processing efficiency, but also reduces load of the processor.

The intelligent network interface card 232 may be implemented in a plurality of manners, and types of the intelligent network interface card 232 include but are not limited to an intelligent network interface card implemented based on a field programmable gate array (FPGA), an intelligent network interface card based on a multi-core network processor (NP), an intelligent network interface card based on a general-purpose processor core, an intelligent network interface card based on an application-specific integrated circuit (ASIC), and the like. The intelligent network interface card can improve network bandwidth and a throughput by performing a network processing function in faster hardware rather than slower software. It should be understood that FIG. 4 shows only an example structure of the intelligent network interface card having a programmable function, and any other existing or future-developed programmable network adapter may be used in combination with embodiments of this disclosure.

Figure 5A:
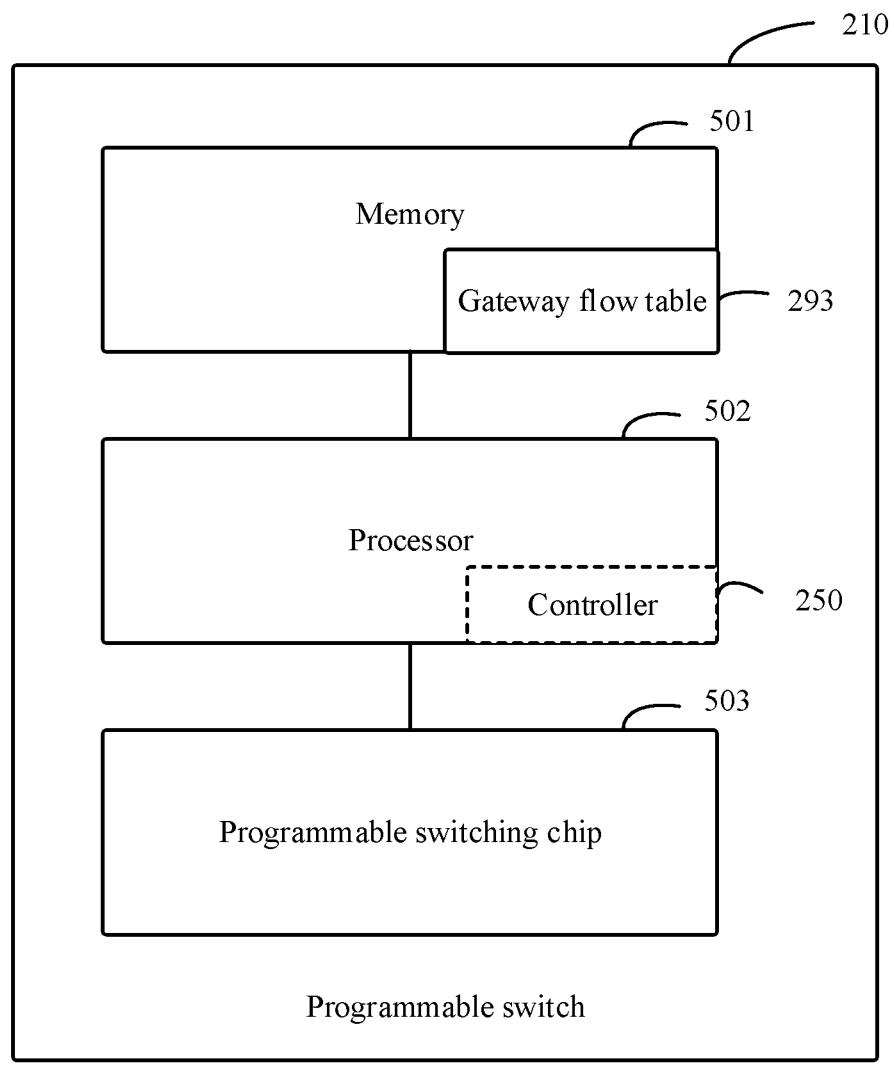
FIG. 5A and FIG. 5B are respectively schematic diagrams of example structures of a programmable switch and a programmable switching chip in the programmable switch according to an embodiment of this disclosure.

FIG. 5A is a schematic diagram of an example structure of a programmable switch 210 according to an embodiment of this disclosure. Different from a switch that has a fixed network processing function, the programmable switch 210 in this embodiment of this disclosure may customize various network processing functions through programming. As shown in FIG. 5A, the programmable switch 210 includes other components such as a memory 501, a processor 502, and a programmable switching chip 503, for example, a power supply. The memory 501 stores a gateway flow table 293, and the gateway flow table 293 may include a gateway flow entry offloaded from the gateway 235. In some embodiments, the controller 250 may be deployed on an operating system of the programmable switch 210, and is run by the processor 502. The controller 250 may control the programmable switching chip 503 through a PCIe interface.

Figure 5B:
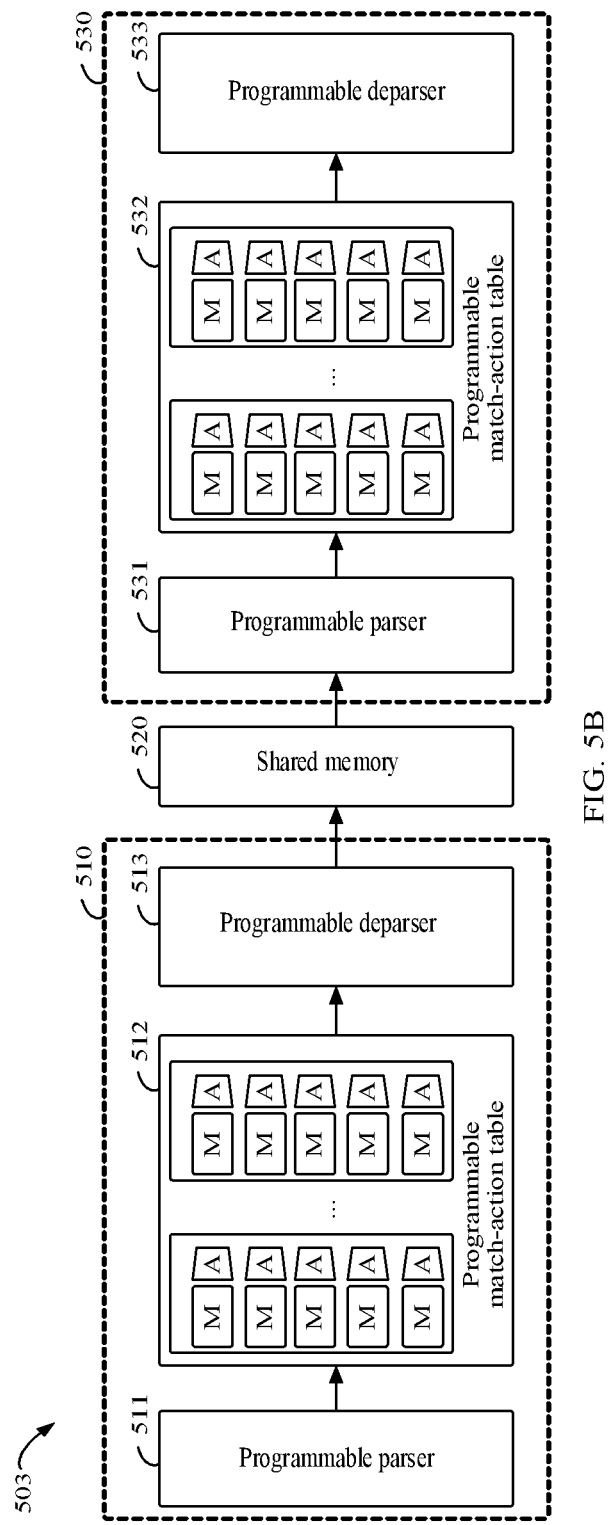

FIG. 5B further shows an example structure of the programmable switching chip 503 in the programmable switch 210. As shown in FIG. 5B, the programmable switching chip 503 may use a programmable Protocol Independent Switch Architecture (PISA), and mainly includes an ingress pipeline 510, a shared memory 520, and an egress pipeline 530. The ingress pipeline 510 and the egress pipeline 530 have a same structure, and each pipeline is: a programmable parser→a programmable match-action table→a programmable deparser. In the ingress pipeline 510, a packet may be forwarded, copied, or discarded, or traffic control on the packet may be triggered, and the egress pipeline 530 may further modify the packet and send the packet to a corresponding egress port. The programmable switching chip 503 is used, so that a new network protocol or a new network function can be flexibly added to the programmable switch 210, for example, some gateway functions implemented by the processor are added.

Still refer to FIG. 5B. The ingress pipeline 510 includes a programmable parser 511, a programmable match-action table 512, and a programmable deparser 513. A user may customize a function of the parser 511 through programming, to parse the packet into a user-defined data structure. The programmable match-action table 512 includes a plurality of match-action units (MAUs). Match and action structures may be defined through programming. Each time a packet is received, a match table lookup operation is performed, and a corresponding action is performed according to a rule defined in a flow entry. The programmable deparser 513 is configured to reassemble a processed header and an original packet into a new packet, and the programmable deparser 513 may also be defined through programming. The shared memory 520 is a high-speed storage pool for buffering, and is configured to buffer a packet. The device implements packet switching from an ingress to an egress by performing a read/write operation on the shared memory 520. The egress pipeline 530 includes a programmable parser 531, a programmable match-action table 532, and a programmable deparser 533, and may also customize functions of the components through programming.

The programmable switching chip 503 may be implemented in a plurality of manners, including but not limited to an FPGA, an ASIC, an NP, and a combination thereof. It should be understood that FIG. 5A and FIG. 5B show only an example structure of the programmable switch having a programmable function, and any other existing or future-developed programmable switch may be used in combination with embodiments of this disclosure.

In some embodiments, traffic may be classified into an elephant flow with a high flow rate (for example, a session with the high flow rate), a medium flow with a medium flow rate (for example, a session with the medium flow rate), and a mice flow with a low flow rate (for example, a session with the low flow rate) based on a flow rate. The flow rate may refer to an amount of data that flows each second. Traffic processed by a gateway running on the server may involve a plurality of sessions. A 5-tuple of each packet in the traffic may be used to identify each session. The 5-tuple includes a source IP address, a destination IP address, a source port, a destination port, and a transport layer protocol. If 5-tuples of different packets are the same, it indicates that these packets belong to a same session. Therefore, an elephant flow, a medium flow, and a mice flow that are of the gateway in a unit time period may be obtained through statistics collection, and then the elephant flow may be offloaded to the programmable switch for processing, the medium flow may be offloaded to the intelligent network interface card for processing, and the mice flow may still be processed by the processor. In this manner, packet flow processing efficiency in the system can be improved. Usually, traffic in a network or a data center is distributed in a long tail manner, and a small quantity of sessions occupy most transmission traffic. Elephant flows have a small quantity but a high throughput, which is more suitable for the programmable switch having a small quantity of flow table resources but strong packet processing performance for processing. Mice flows have a large quantity but a low throughput, which is more suitable for the processor having sufficient resources for processing. Alternatively, each session may also be identified by using a 4-tuple or a 3-tuple, where the 4-tuple may include a source IP address, a destination IP address, a source port, and a destination port, and the 3-tuple may include a source IP address, a source port, and a transport layer protocol, or may include a source IP address, a destination IP address, and a transport layer protocol, or the like.

Figure 6A:
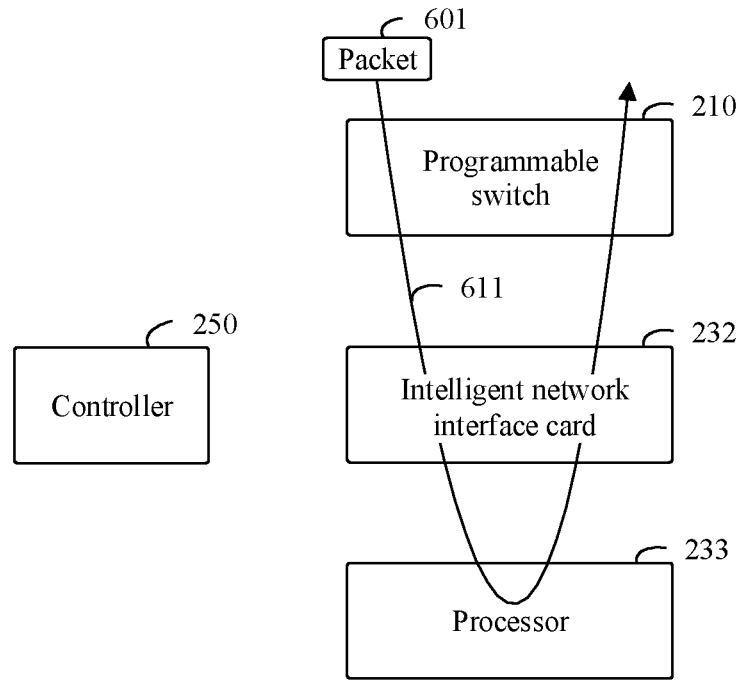
FIG. 6A to FIG. 6D are schematic diagrams of offloading a gateway flow entry according to an embodiment of this disclosure.

FIG. 6A to FIG. 6D are schematic diagrams of offloading a gateway flow entry according to an embodiment of this disclosure. It should be understood that, in this embodiment of this disclosure, an offloading process of the gateway flow entry may be implemented by using the controller 250 or a controller implemented on the processor 233. FIG. 6A shows a normal packet processing manner, for example, an initial phase. In this case, a gateway flow entry has not been offloaded to the programmable switch 210 or the intelligent network interface card 232. In 611, the programmable switch 210 receives a packet 601, and forwards the packet 601 to the server 231 according to a normal forwarding rule because there is no matched gateway flow entry in the local gateway flow table 293 of the programmable switch 210. The intelligent network interface card 232 in the server 231 first receives the packet 601, and forwards the packet 601 to the processor 233 in the server 231 because there is no related gateway flow entry in the local gateway flow table 292 of the intelligent network interface card 232. The gateway 235 executed on the processor 233 processes the packet 601 based on a matched flow entry in the gateway flow table 291, for example, modifies, packs, or discards the packet 601.

In some embodiments, the programmable switch 210 may forward, according to a preset simple scheduling method (for example, ECMP), the packet 601 to the server 231 for processing. ECMP is a routing technology used to implement transmission of a data packet on different paths. A shortest path between two nodes in a network is first calculated. If there are a plurality of equal-cost shortest paths, load balancing is performed. Because implementation of ECMP is simple, ECMP may be directly implemented in the programmable switch 210. Alternatively, the programmable switch 210 may send the packet 601 to the controller 250, and the controller 250 determines, according to an internal scheduling algorithm, a server to which the packet 601 is to be sent, and sends a related forwarding entry to the programmable switch 210. Because the controller 250 has a stronger scheduling capability, the controller 250 can indicate the programmable switch 210 to forward the packet 601 to a most suitable server. According to this embodiment of this disclosure, the programmable switch 210 may store two types of flow tables. One is a forwarding flow table (not shown) for performing a switch function. For example, the programmable switch 210 forwards a packet to a server gateway based on a forwarding entry in the forwarding flow table. The other is an offloaded gateway flow table 293. For example, the programmable switch 210 processes a packet based on a gateway flow entry in the gateway flow table 293, for example, matches, modifies, or discards the packet.

Figure 6B:
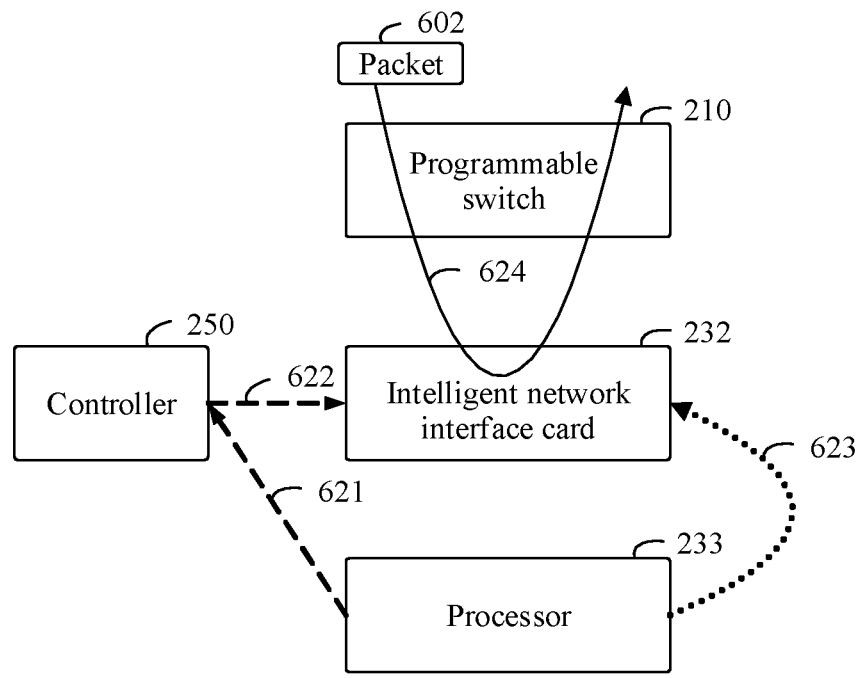
Figure 6C:
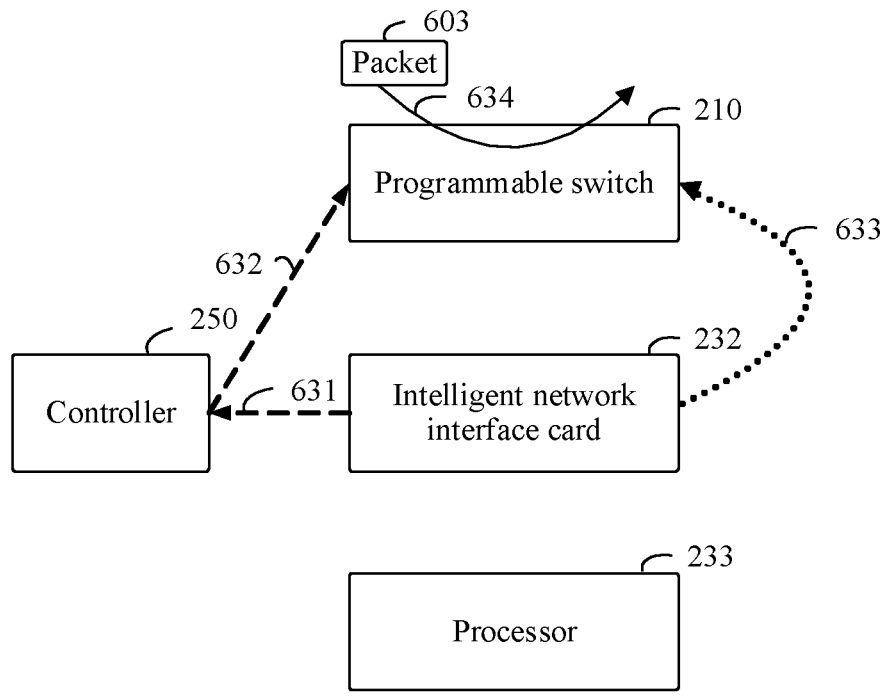

FIG. 6B and FIG. 6C are schematic diagrams of offloading a gateway flow entry in phases. FIG. 6B shows a first phase of offloading a gateway flow entry to the intelligent network interface card 232. The processor 233 in the server 231 collects statistics about traffic processed by the gateway 235 in a unit time window (for example, 1 second), for example, determines traffic rankings of a plurality of sessions in the traffic based on a 5-tuple of a packet. Optionally, in 621, the processor 233 sends session information (for example, header information) of the first m sessions with high rankings to the controller 250. Then, in 622, the controller 250 sends a gateway flow entry corresponding to the first m sessions to the intelligent network interface card 232.

Alternatively, in 623, the processor 233 may directly send a gateway flow entry corresponding to the first m sessions to the intelligent network interface card 232, and the controller 250 does not need to offload the gateway flow entry. In this case, the processor 233 implements a function of the controller 250. Next, in 624, the programmable switch 210 receives a packet 602, where the packet 602 and the packet 601 may belong to a same session. After the programmable switch 210 forwards the packet 602 to the intelligent network interface card 232, because a gateway flow entry related to the packet has been offloaded to the intelligent network interface card 232, the intelligent network interface card 232 can directly process the packet 602 without forwarding the packet 602 to the processor 233 for processing, to improve packet processing efficiency. In some embodiments, when finding that the gateway flow table 292 in the intelligent network interface card 232 has remaining storage space, the controller 250 may obtain corresponding session information of the first m sessions. In addition, a value of m may be determined based on the remaining storage space of the gateway flow table 292 in the intelligent network interface card 232.

FIG. 6C shows a second phase of offloading a gateway flow entry to the programmable switch 210. The intelligent network interface card 232 in the server 231 collects statistics about traffic processed in a unit time window, for example, determines traffic rankings of a plurality of sessions in the traffic based on a 5-tuple of a packet. Optionally, in 631, the intelligent network interface card 232 sends session information of the n sessions with high rankings to the controller 250. Then, in 632, the controller 250 sends a gateway flow entry corresponding to the first n sessions to the programmable switch 210.

Alternatively, in 633, the intelligent network interface card 232 may directly send a gateway flow entry corresponding to the first n sessions to the programmable switch 210, and the controller 250 does not need to offload the gateway flow entry. Next, in 634, when the programmable switch 210 receives a packet 603 that belongs to the same session as the packet 601, because a gateway flow entry related to the packet 603 has been offloaded to the gateway flow table 293 in the programmable switch 210, the programmable switch 210 directly processes the packet 603 without forwarding the packet 603 to the server 231 for processing, to further improve packet processing efficiency. In some embodiments, when finding that the gateway flow table 293 in the programmable switch 210 has remaining storage space, the controller 250 may obtain corresponding session information of the first n sessions. In addition, a value of n may be determined based on the remaining storage space of the programmable switch 210 and allocation proportions of gateways on different servers. For example, assuming that the programmable switch 210 is connected to 10 server gateways, each server gateway may offload one tenth of total space of the gateway flow table 293 in the programmable switch 210. Traffic processing performance of the programmable switch 210 is higher than traffic processing performance of the intelligent network interface card 232, and the traffic processing performance of the intelligent network interface card 232 is higher than traffic processing performance of the processor 233. Therefore, offloading a gateway flow entry to the programmable switch 210 and the intelligent network interface card 232 can improve packet processing efficiency, increase a throughput, and reduce a delay.

Figure 6D:
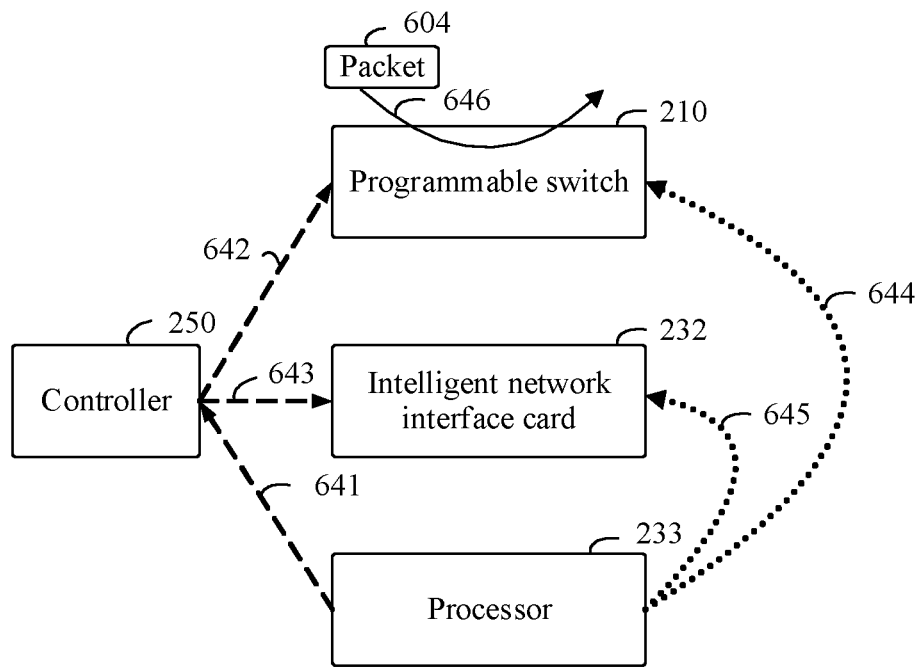

FIG. 6D is a schematic diagram of offloading a gateway flow entry in a joint manner. The processor 233 in the server 231 collects statistics about traffic of the gateway 235 in a unit time window, for example, determines traffic rankings of a plurality of sessions in the traffic based on a 5-tuple of a packet. Optionally, in 641, the processor 233 sends session information of the first p+q sessions with high rankings to the controller 250. Then, in 642, the controller 250 sends a gateway flow entry corresponding to the first p sessions to the programmable switch 210, and in 643, the controller 250 sends a gateway flow entry corresponding to the remaining q sessions to the intelligent network interface card 232.

Alternatively, in 644, the processor 233 may directly send a gateway flow entry corresponding to the first p sessions to the programmable switch 210, and in 645, the processor 233 directly sends a gateway flow entry corresponding to the remaining q sessions to the intelligent network interface card 232, and the controller 250 does not need to offload the gateway flow entry. In 646, when the programmable switch 210 receives a packet 604 that belongs to the same session as the packet 601, because a gateway flow entry corresponding to the packet has been offloaded to the gateway flow table 293 in the programmable switch 210, the programmable switch 210 directly processes the packet 604 without forwarding the packet 604 to the server 231 for processing.

In some embodiments, when finding that the programmable switch 210 and the intelligent network interface card 232 have remaining gateway flow table space, the controller 250 may initiate obtaining of session information of the first p+q sessions. In addition, a value of p may be determined based on the remaining storage space of the gateway flow table 293 in the programmable switch 210 and allocation proportions of gateways on different servers, and a value of q may be determined based on the remaining storage space of the gateway flow table 292 in the intelligent network interface card 232. In this manner, based on characteristics of network traffic, different data flows are offloaded to devices at different layers for processing, to further improve packet processing efficiency. In some embodiments, a flow entry related to the session information of the first p+q sessions may be offloaded based on a percent. For example, a flow entry in a session with, for example, the first 30 percent of a flow rate that is about which statistics is collected at the gateway 235 in the processor 233 is offloaded to the programmable switch 210, a flow entry in a session with, for example, the medium 40 percent of the flow rate that is about which statistics is collected at the gateway 235 in the processor 233 is offloaded to the intelligent network interface card 232, and a packet in a session with the last 30 percent of the flow rate is still processed by the processor 233. In addition, FIG. 6B to FIG. 6D may show an offloading policy of a gateway flow entry in an initial phase.

In a subsequent process, a new gateway flow entry may be dynamically offloaded to the programmable switch 210 and/or the intelligent network interface card 232 based on a size of space released after the flow tables/the flow table in the programmable switch 210 and/or the intelligent network interface card 232 are/is cleared.

Figure 7A:
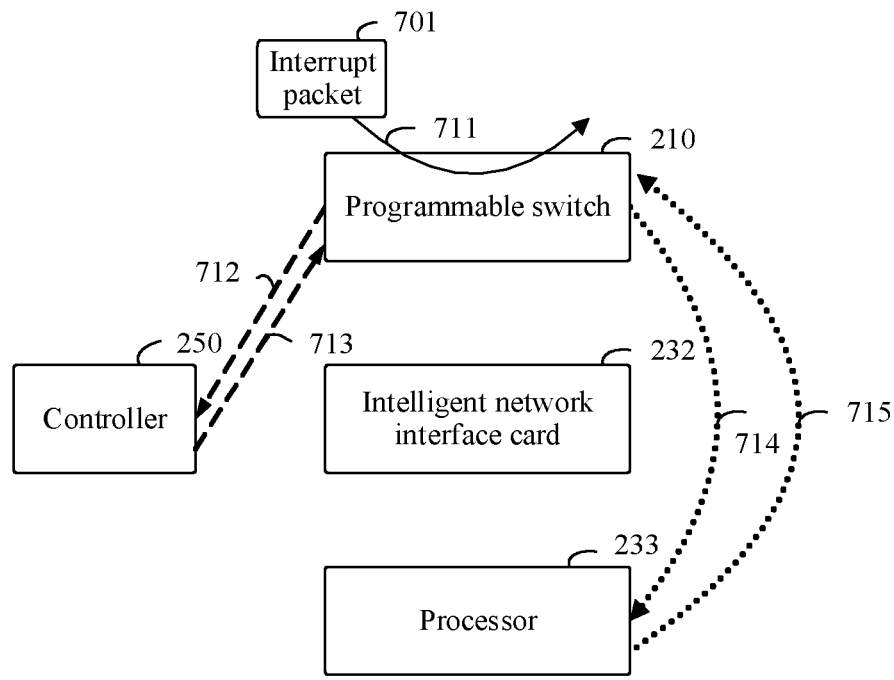
FIG. 7A to FIG. 7C are schematic diagrams of clearing a gateway flow entry according to an embodiment of this disclosure.
Figure 7B:
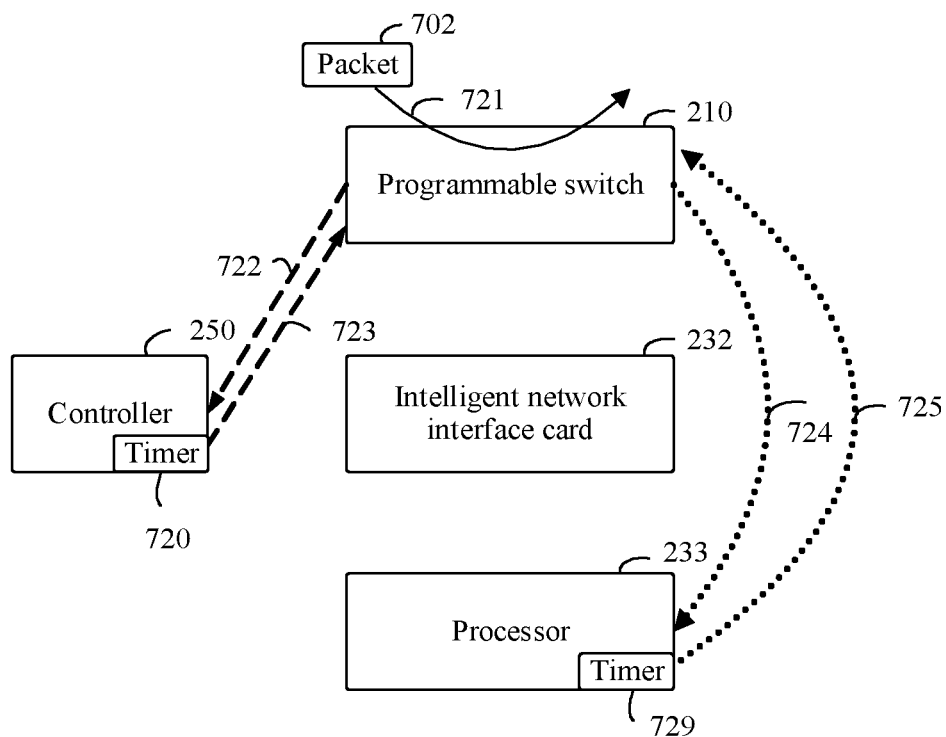
Figure 7C:
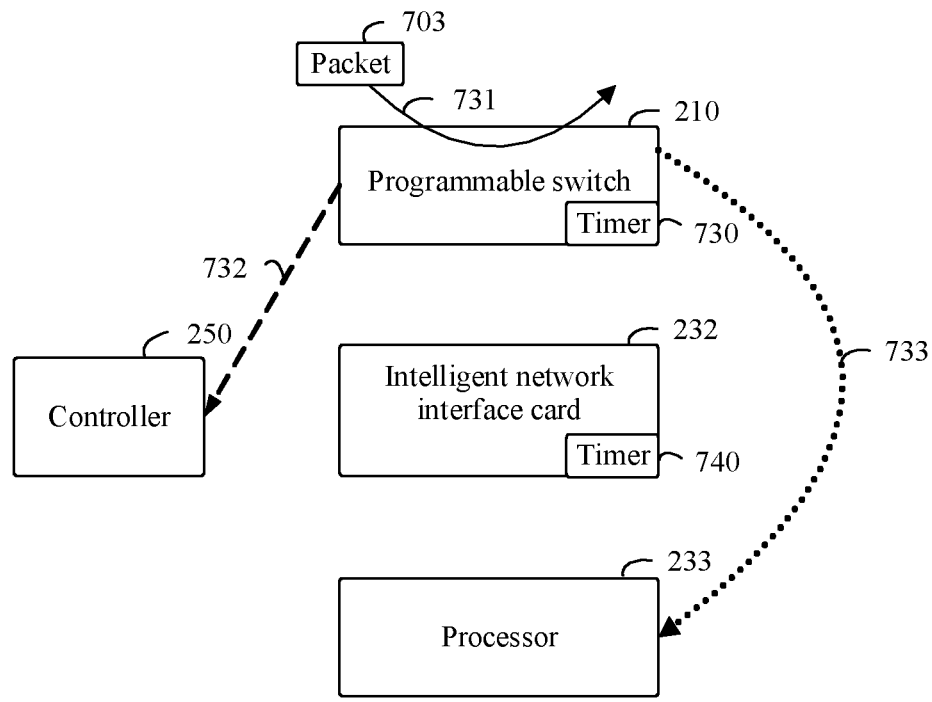

FIG. 7A to FIG. 7C are three example schematic diagrams of clearing a gateway flow entry according to an embodiment of this disclosure. It should be understood that flow entry clearing in this embodiment of this disclosure may be implemented by using the controller 250 or a controller implemented on the processor 233. FIG. 7A shows a manner of clearing a flow entry when a session is interrupted. In 711, the programmable switch 210 identifies a session interrupt packet 701 (for example, a Transmission Control Protocol (TCP) session interrupt flag packet) including an interrupt flag (for example, FIN or RST). Optionally, in 712, the programmable switch 210 sends the interrupt packet 701 to the controller 250. The controller 250 determines, based on the interrupt flag, whether a session ends, and when determining that the session ends, sends, to the programmable switch 210 in 713, an instruction used to delete a gateway flow entry related to the session.

Alternatively, in 714, the programmable switch 210 may send the interrupt packet 701 to the processor 233. The processor 233 determines, based on the interrupt flag, whether a session ends, and when determining that the session ends, sends, to the programmable switch 210 in 715, an instruction used to delete a gateway flow entry related to the session. After receiving the deletion instruction, the programmable switch 210 may delete the gateway flow entry related to the session, for example, delete a related gateway flow entry in the gateway flow table 293. Alternatively or additionally, when identifying the session interrupt packet, the intelligent network interface card 232 may also delete a related gateway flow entry in the gateway flow table 292 in a similar manner. Clearing a gateway flow entry related to the ended session can release storage space of flow tables/a flow table in the programmable switch and/or the intelligent network interface card. This helps add a new gateway flow entry, to further improve packet processing performance.

FIG. 7B shows a manner of clearing a flow entry due to expiration. In 721, during packet receiving, optionally, as shown in 722, the programmable switch 210 may periodically (for example, at an interval of 5 seconds) send a session heartbeat packet to the controller 250. The controller 250 includes a timer 720, and the timer 720 may perform timing on each session based on the received session heartbeat packet. If a session heartbeat packet in a session is not received within a unit time period, it indicates that the session may have ended or terminated. Therefore, in 723, the controller 250 may send, to the programmable switch 210, an instruction used to delete a gateway flow entry related to the session.

Alternatively, during packet receiving, the programmable switch 210 may periodically (for example, at an interval of 5 seconds) send a session heartbeat packet to the processor 233 in 724. The processor 233 includes a timer 729, and the timer 729 may perform timing on each session based on the received session heartbeat packet. If a session heartbeat packet in a session is not received within a unit time period, it indicates that the session may have ended or terminated. Therefore, in 725, the processor 233 may send, to the programmable switch 210, an instruction used to delete a gateway flow entry related to the session. After receiving the deletion instruction, the programmable switch 210 may delete the gateway flow entry related to the session, for example, delete a related gateway flow entry in the gateway flow table 293. Alternatively or additionally, if the controller 250 or the processor 233 does not receive the session heartbeat packet from the intelligent network interface card 232 within the unit time period, the controller 250 or the timer 233 may also delete a gateway flow entry related to the session in the gateway flow table 292 in the intelligent network interface card 232 in a similar manner.

FIG. 7C shows another manner of clearing a flow entry due to expiration. As shown in FIG. 7C, the programmable switch 210 includes a timer 730. The gateway flow table 293 in the programmable switch 210 stores timestamp information associated with a gateway flow entry, and the timestamp information may be used to record a time point at which the gateway flow entry is last used. After determining, based on the timestamp information, that a gateway flow entry in the gateway flow table 293 is not used within a threshold time period, the timer 730 may indicate to delete the gateway flow entry. Optionally, in 732, the programmable switch 210 may send, to the controller 250, an indication indicating that the gateway flow entry has been deleted. Alternatively, in 733, the programmable switch 210 may send, to the processor 233, an indication indicating that the gateway flow entry has been deleted. In addition, the intelligent network interface card 232 may also include a similar timer 740, and the timer 740 may clear a gateway flow entry in the gateway flow table 292 due to expiration. In this manner, the controller or the processor can obtain current gateway flow entries/a current gateway flow entry in the programmable switch and/or the intelligent network interface card in real time, and help offload new gateway flow entries/a new gateway flow entry to the programmable switch and/or the intelligent network interface card. Clearing a gateway flow entry that is not used within a time period can release storage space of flow tables/a flow table in the programmable switch and/or the intelligent network interface card. This helps add a new gateway flow entry, to further improve packet processing performance.

Figure 8A:
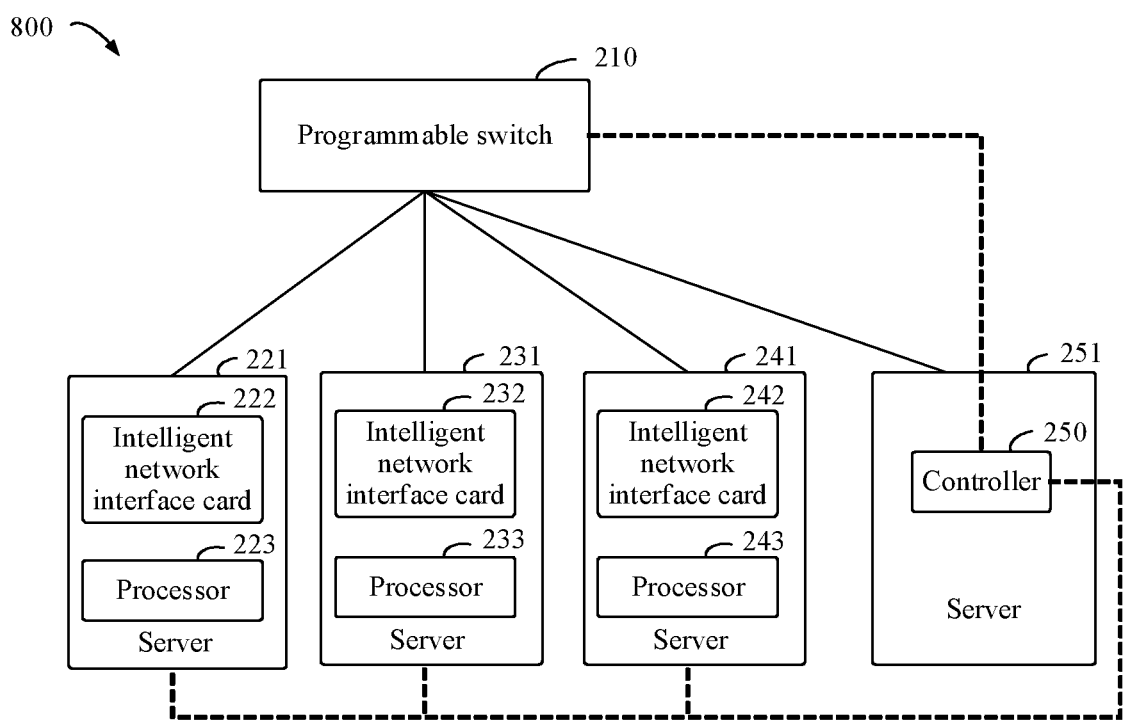
FIG. 8A and FIG. 8B are schematic diagrams of deployment of a controller in a packet processing system according to an embodiment of this disclosure.
Figure 8B:
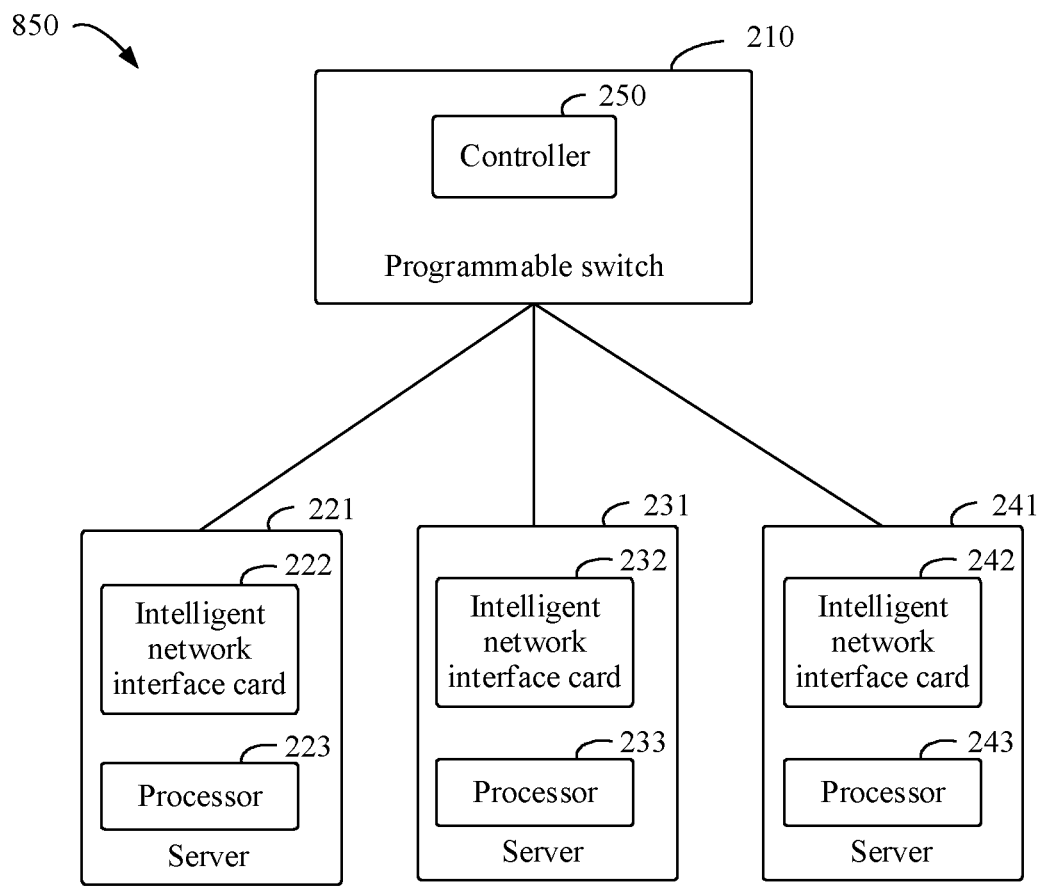

FIG. 8A and FIG. 8B are schematic diagrams of deployment of a controller in a packet processing system according to an embodiment of this disclosure. FIG. 8A shows an architecture 800 of a packet processing system in which a controller is deployed in a server. The controller 250 may be deployed in a server 251, and the server 251 may be, for example, located in the same server cabinet as the servers 221, 231, and 241. The controller 250 may control offloading and clearing of gateway flow entries in the programmable switch 210, the intelligent network interface cards 222, 232, and 242, and the processors 223, 233, and 243. Because the server 251 has high programmable performance, the deployed controller 250 can have a flexible traffic scheduling capability, to assist the programmable switch 210 in improving a scheduling capability of the entire packet processing system.

FIG. 8B shows an architecture 850 of a packet processing system in which a controller is deployed in a programmable switch. Alternatively, the controller 250 may be deployed in an operating system of the programmable switch 210 and run by the processor 502 in the programmable switch 210. The controller 250 controls the programmable switching chip 503 in the programmable switch 210 through a PCIe interface, and offloads flow entries in the intelligent network interface card and the processor through a service data plane of the programmable switch 210. In addition to the programmable switching chip, the programmable switch 210 further includes a programmable processor (for example, the processor 502 shown in FIG. 5A). Therefore, the controller 250 may also be implemented by using the processor 502 in the programmable switch 210, to improve controller deployment flexibility and simplify a network structure. Therefore, the controller 250 can improve a flexible traffic scheduling capability of a gateway cluster.

Figure 9:
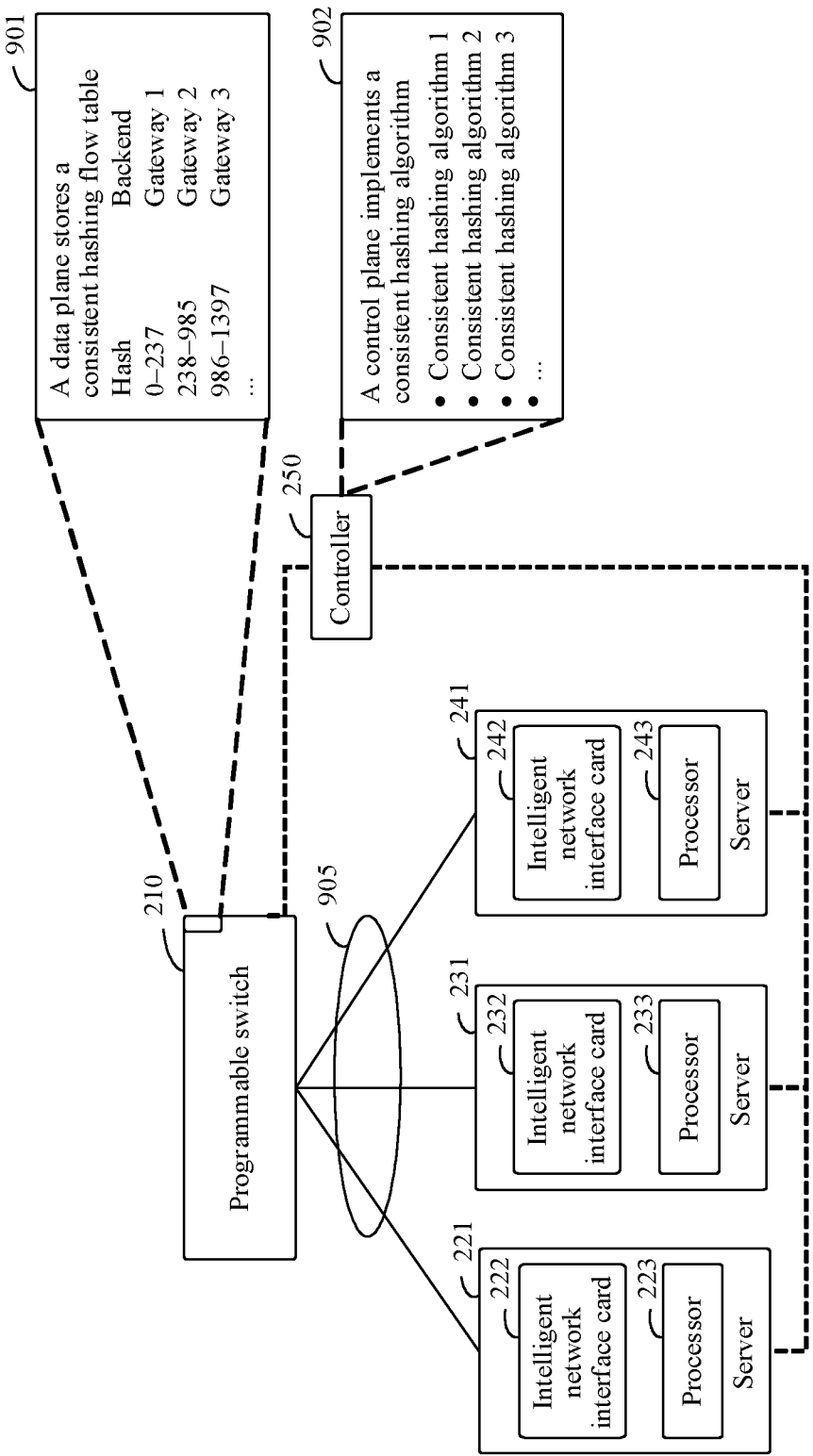
FIG. 9 is a schematic diagram of implementing consistent hashing according to an embodiment of this disclosure.

FIG. 9 is a schematic diagram of implementing consistent hashing according to an embodiment of this disclosure. Because a controller 250 is deployed in the packet processing system 200 in this disclosure, some complex scheduling algorithms, such as consistent hashing scheduling, can be implemented. For example, in a cloud environment, a virtual gateway node may be classified into a stateless gateway and a stateful gateway. The stateless gateway performs a simple operation on and forwards a packet based on a flow table. The stateful gateway, such as a Linux virtual server (LVS), an Nginx server, a NAT gateway, or a stateful firewall, needs to perform connection tracking and session persistence. In the cloud environment, the stateful gateway is responsible for a stateful service processing procedure. The stateful gateway records a traffic status. Therefore, a data flow needs to be processed by a fixed gateway before the data flow ends. The gateway cluster has a dynamic change scenario such as going online or offline. As a result, traffic is hashed to different gateways, causing traffic session interruption and affecting services. Therefore, a consistent hashing algorithm can be used to resolve this problem and ensure that traffic can also be hashed to a same gateway when a backend gateway changes.

Considering that the consistent hashing algorithm is complex, the consistent hashing algorithm usually cannot be implemented on a common physical switch (the common switch does not have sufficient computing performance). As shown in FIG. 9, according to this embodiment of this disclosure, the controller 250 implements a complex consistent hashing algorithm. For example, a control plane implements a consistent hashing algorithm 902, and sends a related consistent hashing flow table 901 to the programmable switch 210 for storage, so that a data plane stores the consistent hashing flow table 901. The programmable switch 210 calculates a corresponding hash based on a header of a packet, and then forwards the packet to a fixed gateway by querying the consistent hashing flow table 901, to implement consistent hash scheduling, as shown in 905. A complex traffic scheduling function can be implemented in the programmable switch 210 through collaboration between the control plane and the data plane by using a programmable capability of the programmable switch 210 and the controller 250. In addition to consistent hashing, the packet processing system 200 in this embodiment of this disclosure can further implement another complex scheduling function such as load balancing.

Figure 10:
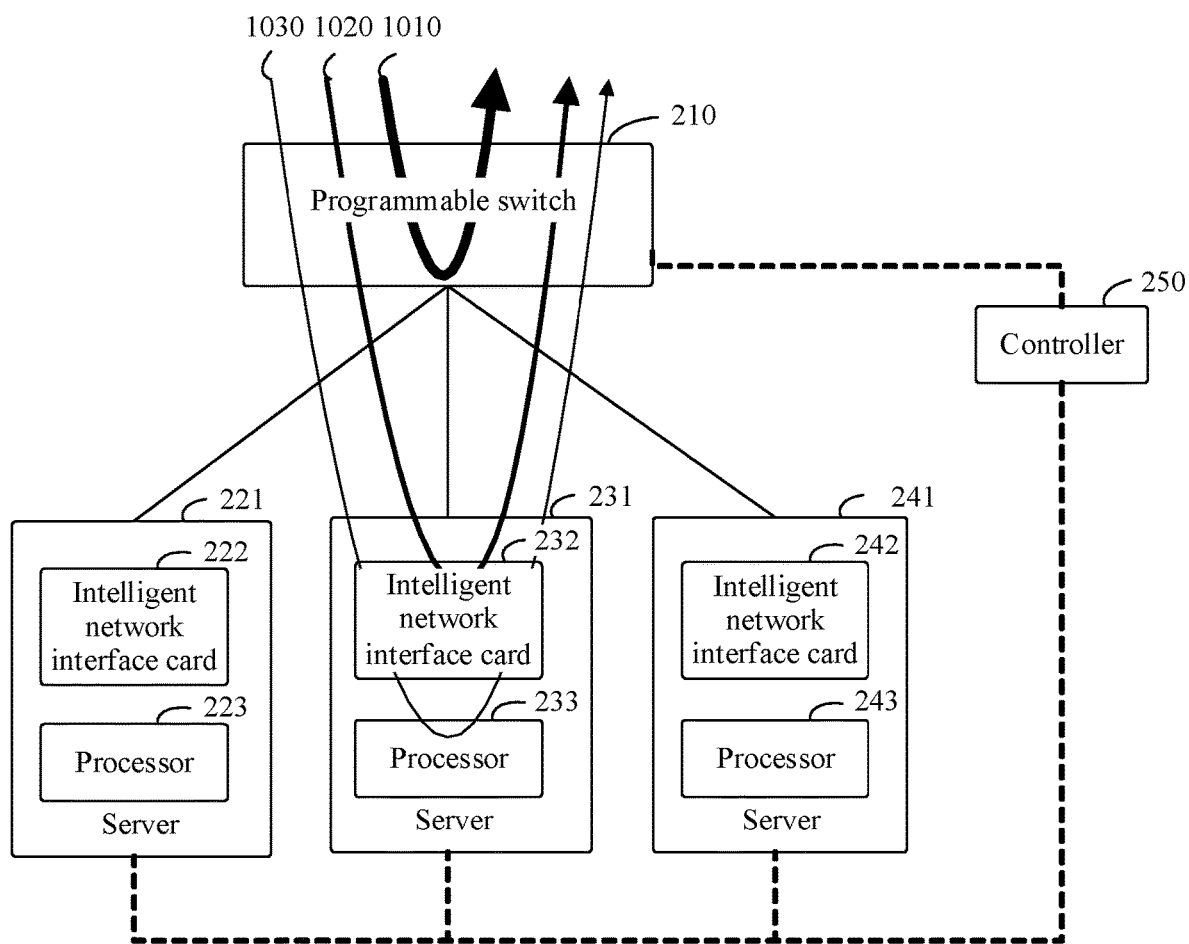
FIG. 10 is a schematic diagram of performing classification and distribution on traffic at different flow rates according to an embodiment of this disclosure.

FIG. 10 is a schematic diagram of performing classification and distribution on traffic at different flow rates according to an embodiment of this disclosure. As shown in FIG. 10, statistics about traffic processed by the server 231 in a unit time period may be collected, and elephant and mice flows are identified. For example, an elephant flow 1010 (for example, a video stream) with a high flow rate, a medium flow 1020 (for example, social network browsing) with a medium flow rate, and a mice flow 1030 (for example, text chat) with a low flow rate are identified. For the elephant flow 1010, the controller 250 offloads a gateway flow entry related to the elephant flow 1010 to the programmable switch 210, so that the programmable switch 210 can directly perform packet processing on the elephant flow 1010 without forwarding the elephant flow 1010 to the server 231 for processing. For the medium flow 1020, the controller 250 offloads a gateway flow entry related to the medium flow 1020 to the intelligent network interface card 232, so that the intelligent network interface card 232 can directly perform packet processing on the medium flow 1020 without forwarding the medium flow 1020 to the processor 233 for processing. In addition, packet processing may still be performed on the remaining mice flow 1030 by the gateway 235 running on the processor 233. Because traffic of the mice flow 1030 is light, impact on a throughput and a delay is small.

In an example of this disclosure, the elephant flow 1010 occupies, for example, 89% of total traffic, the medium flow 1020 occupies, for example, 10% of the total traffic, and the mice flow 1030 occupies, for example, only 1% of the total traffic. According to this embodiment of this disclosure, the programmable switch 210 with best traffic processing performance is enabled to process an elephant flow with heavy traffic, and the intelligent network interface card 232 with good traffic processing performance is enabled to process a medium flow with medium traffic. In this manner, a throughput of the packet processing system can be improved, a delay can be reduced, and traffic processing load of the processor can be reduced. Therefore, the packet processing system in this disclosure uses an adaptive traffic processing architecture, including software implementation of the processor and hardware implementation of the programmable switch and the intelligent network interface card, to implement automatic traffic steering and classification and distribution.

According to embodiments of this disclosure, some gateway functions at a processor in a gateway server are offloaded to a programmable switch and an intelligent network interface card for implementation. In embodiments of this disclosure, an elephant flow is offloaded to the programmable switch for processing. Because the programmable switch has a very high throughput and a very short processing delay, performance of a gateway cluster can be significantly improved, and processing pressure of the gateway cluster can be reduced. In embodiments of this disclosure, a medium flow is further offloaded to the intelligent network interface card. Because traffic processing performance of the intelligent network interface card is better than traffic processing performance of the processor, performance of the gateway cluster can be further improved. According to some embodiments of this disclosure, a distributed node collaboration manner is used. Because load of the gateway cluster is significantly reduced, load balancing between gateway clusters can be ensured, and a session connection can be maintained. In addition, a user-defined traffic scheduling policy in embodiments of this disclosure can further implement gateway upgrade, malicious traffic isolation, and the like.

Various aspects of this disclosure are described herein with reference to flowcharts and/or block diagrams of the system, the method, the machine-readable storage medium, and the program product implemented according to this disclosure. It should be understood that each block in the flowcharts and/or block diagrams and a combination of blocks in the flowcharts and/or block diagrams may be implemented by using machine-readable instructions.

These machine-readable instructions may be provided to a general-purpose computer, a dedicated computer, or a processing unit of another programmable information rendering apparatus to produce a machine, so that when the instructions are executed by the computer or the processing unit of the other programmable information rendering apparatus, an apparatus that implements functions/actions specified in one or more blocks in the flowcharts and/or block diagrams is generated. These machine-readable instructions may alternatively be stored in the machine-readable storage medium. These instructions enable a computer, a programmable information rendering apparatus, and/or another device to work in a specific manner. Therefore, the computer-readable medium storing the instructions includes an artifact that includes instructions for implementing the various aspects of functions/actions specified in one or more blocks in the flowcharts and/or block diagrams.

The machine-readable instructions may be loaded onto a computer, another programmable information rendering apparatus, or another device, so that a series of operation steps are performed on the computer, the other programmable information rendering apparatus, or the other device to produce a machine-implemented process. Therefore, instructions executed on the computer, the other programmable information rendering apparatus, or the other device implements functions/actions specified in one or more blocks in the flowcharts and/or block diagrams.

The flowcharts and block diagrams in the accompanying drawings display the system architecture, function, and operation of possible implementations of the system, the method, and the computer program product according to a plurality of embodiments of this disclosure. In this regard, each block in the flowcharts or block diagrams may represent a module, a program segment, or a part of the instructions, and the module, the program segment, or the part of the instructions includes one or more executable instructions for implementing a specified logical function. In some alternative implementations, a function marked in the block may also occur in a sequence different from that marked in the accompanying drawings. For example, two consecutive blocks may actually be executed substantially in parallel, and may sometimes be executed in reverse order, depending on a function involved. It should also be noted that each block in the block diagrams and/or flowcharts, and the combination of the blocks in the block diagrams and/or flowcharts may be implemented by a dedicated hardware-based system that performs a specified function or action or may be implemented by a combination of dedicated hardware and computer instructions.

The implementations of this disclosure are described above. The foregoing descriptions are examples, are not exhaustive, and are not limited to the disclosed implementations. Many modifications and variations are apparent to a person of ordinary skill in the art without departing from the scope of the described implementations. Selection of terms used in this specification is intended to best explain implementation principles, actual application, or improvements to technologies in the market, or to enable another person of ordinary skill in the art to understand the implementations disclosed in this specification.

What is claimed is:

1. A packet processing system, comprising:
   a programmable forwarding device configured to:
      receive a packet comprising header information;
      compare the header information to a first match field of a first flow entry in a first flow table accessible to the programmable forwarding device to determine whether a first matching flow entry exists in the first flow table;
      send, when the first matching flow entry does not exist in the first flow table accessible to the programmable forwarding device, the packet to a programmable network adapter; and
      process, when the first matching flow entry exists in the first flow table, the packet based on the first flow entry existing in the first flow table accessible to the programmable forwarding device, wherein the first matching flow entry existing in the first flow table accessible to the programmable forwarding device is offloaded from a second flow table accessible to the programmable network adapter;
   a computing device comprising:
      the programmable network adapter configured to:
         receive the packet from the programmable forwarding device;
         compare the header information to a second match field of a second flow entry in the second flow table accessible to the programmable network adapter to determine whether a second matching flow entry exists in the second flow table;
         send, when the second flow entry does not exist in the second flow table accessible to the programmable network adapter, the packet to a processor; and
         process, when the second matching flow entry exists in the second flow table, the packet based on the second matching flow entry existing in the second flow table accessible to the programmable network adapter, wherein second matching flow entry existing in the second flow table accessible to the programmable network adapter device is offloaded from a third flow table accessible to a gateway running on the processor; and
      the processor configured to:
         run, when the first matching flow entry does not exist in the first flow table and when the second matching flow entry does not exist in the second flow table, the gateway to receive the packet from the programmable network adapter; and
         process, based on a third flow entry in the third flow table accessible to the gateway, the packet.

2. The packet processing system of claim 1, further comprising a controller, wherein the header information comprises an interrupt flag, and wherein the programmable forwarding device or the programmable network adapter is further configured to:
   identify the packet as a session interrupt packet based on the interrupt flag in the header information; and
   send the session interrupt packet to the controller or the processor, and
   wherein the controller or the processor is further configured to:
      determine, based on the session interrupt packet, whether a session ends; and
      send, when the session ends, an instruction to the programmable forwarding device or the programmable network adapter to delete a fourth flow entry corresponding to the session.

3. The packet processing system of claim 1, further comprising a controller configured to send a forwarding entry to the programmable forwarding device, and wherein when the first matching flow entry does not exist in the first flow table, the programmable forwarding device is further configured to determine, based on the forwarding entry, that the packet is to be forwarded to the computing device.

4. The packet processing system of claim 1, wherein the programmable forwarding device is a programmable switch having a programmable parser, a programmable match-action table, and a programmable deparser, wherein the computing device is a server, and wherein the programmable network adapter is an intelligent network interface card having a communication protocol processing capability.

5. A packet processing method, comprising:
receiving, by a programmable forwarding device, a packet comprising header information;
comparing, by the programmable forwarding device, the header information to a first match field of a first flow entry in a first flow table accessible to the programmable forwarding device to determine whether if a first matching flow entry exists in the first flow table;
sending, by the programmable forwarding device and when the first matching flow entry does not exist in the first flow table accessible to the programmable forwarding device, the packet to a programmable network adapter in a computing device;
processing, by the programmable forwarding device and when determining that the first flow entry exists in the first flow table, the packet based on the first flow entry, wherein the first flow entry existing in the first flow table accessible to the programmable forwarding device is offloaded from a second flow table accessible to the programmable network adapter;
receiving, by the programmable network adapter, the packet;
comparing, by the programmable network adapter, the header information to a second match field of a second flow entry in the second flow table accessible to the programmable network adapter to determine whether a second matching flow entry exists in the second flow table;
sending, by the programmable network adapter and when the second flow entry does not exist in the second flow table accessible to the programmable network adapter, the packet to a processor in the computing device;
processing, when the second matching flow entry exists in the second flow table, the packet based on the second flow entry existing in the second flow table accessible to the programmable network adapter, wherein second first flow entry existing in the second flow table accessible to the programmable network adapter is offloaded from a third flow table accessible to a gateway running on the processor;
receiving, by the gateway running on the processor when the first matching flow entry does not exist in the first flow table and when the second matching flow entry does not exist in the second flow table, the packet; and
processing, by the gateway and based on a third flow entry in the third flow table accessible to the gateway, the packet.

6. The packet processing method of claim 5, wherein the programmable forwarding device is a programmable switch having a programmable parser, a programmable match-action table, and a programmable deparser, wherein the computing device is a server, and wherein the programmable network adapter is an intelligent network interface card having a communication protocol processing capability.

7. The packet processing method of claim 5, wherein the header information comprises an interrupt flag, and wherein the method further comprises:
identifying, by the programmable forwarding device, the packet as a session interrupt packet based on the interrupt flag in the header information;
sending, by the programmable forwarding device, the session interrupt packet to a controller;
determining, by the controller and based on the session interrupt packet, whether a session ends; and
sending, by the controller and when the session ends, an instruction to the programmable forwarding device to delete a fourth flow entry corresponding to the session.

8. The packet processing method of claim 5, wherein the header information comprises an interrupt flag, and wherein the method further comprises:
identifying, by the programmable network adapter, the packet as a session interrupt packet based on the interrupt flag in the header information;
sending, by the programmable network adapter, the session interrupt packet to a controller;
determining, by the controller and based on the session interrupt packet, whether a session ends; and
sending, by the controller and when the session ends, an instruction to the programmable network adapter to delete a fourth flow entry corresponding to the session.

9. The packet processing method of claim 5, wherein the header information comprises an interrupt flag, and wherein the method further comprises:
identifying, by the programmable forwarding device, the packet as a session interrupt packet based on the interrupt flag in the header information;
sending, by the programmable forwarding device, the session interrupt packet to the processor;
determining, by the processor and based on the session interrupt packet, whether a session ends; and
sending, by the processor and when the session ends, an instruction to the programmable forwarding device to delete a fourth flow entry corresponding to the session.

10. The packet processing method of claim 5, wherein the header information comprises an interrupt flag, and wherein the method further comprises:
identifying, by the programmable network adapter, the packet as a session interrupt packet based on the interrupt flag in the header information;
sending, by the programmable network adapter, the session interrupt packet to the processor;
determining, by the processor and based on the session interrupt packet, whether a session ends; and
sending, by the processor and when the session ends, an instruction to the programmable network adapter to delete a fourth flow entry corresponding to the session.

11. The packet processing method of claim 10, wherein the session interrupt packet comprises a Transmission Control Protocol (TCP) session interrupt flag packet.

12. The packet processing method of claim 10, wherein the interrupt flag comprises a finish (FIN) flag.

13. The packet processing method of claim 10, wherein the interrupt flag comprises a reset (RST) flag.

14. The packet processing method of claim 5, wherein the header information comprises a source IP address, a destination IP address, a source port, a destination port, and a transport layer protocol.

15. The packet processing system of claim 2, wherein the session interrupt packet comprises a Transmission Control Protocol (TCP) session interrupt flag packet.

16. The packet processing system of claim 2, wherein the interrupt flag comprises a finish (FIN) flag.

17. The packet processing system of claim 2, wherein the interrupt flag comprises a reset (RST) flag.

18. The packet processing system of claim 2, wherein the header information comprises a source IP address, a destination IP address, a source port, a destination port, and a transport layer protocol.

* * * * *